United States Patent
Wagner et al.

(10) Patent No.: US 11,975,970 B2
(45) Date of Patent: May 7, 2024

(54) PRODUCTION OF CARBON NANOCHAINS AND NANOTUBES FROM BIOMASS

(71) Applicant: The George Washington University, Washington, DC (US)

(72) Inventors: Michael J. Wagner, Rockville, MD (US); Nathan A. Banek, Rockville, MD (US); Dustin T Abele, Arlington, VA (US); Kevin R. McKenzie, Jr., Arlington, VA (US)

(73) Assignee: The George Washington University, Washington, DC (US)

( * ) Notice: Subject to any disclaimer, the term of this patent is extended or adjusted under 35 U.S.C. 154(b) by 262 days.

(21) Appl. No.: 17/384,364

(22) Filed: Jul. 23, 2021

(65) Prior Publication Data

US 2022/0089445 A1 Mar. 24, 2022

Related U.S. Application Data

(60) Provisional application No. 63/081,650, filed on Sep. 22, 2020.

(51) Int. Cl.
*C01B 32/18* (2017.01)
*B01J 19/12* (2006.01)
*B82Y 40/00* (2011.01)
*C01B 32/162* (2017.01)

(52) U.S. Cl.
CPC ............. *C01B 32/18* (2017.08); *B01J 19/121* (2013.01); *B82Y 40/00* (2013.01); *C01B 32/162* (2017.08);
(Continued)

(58) Field of Classification Search
CPC ....... C01B 32/18; C01B 32/162; C01B 32/16; B01J 19/121; B01J 2219/0879;
(Continued)

(56) References Cited

U.S. PATENT DOCUMENTS 7,601,321 B2 * 10/2009 McKinnon ............ B82Y 40/00
   75/414
10,511,017 B2 12/2019 Wagner et al.
(Continued)

FOREIGN PATENT DOCUMENTS

WO  WO 2018/186958   * 10/2018  ............ C01B 32/20
WO  WO-2018/186958 A1  10/2018

OTHER PUBLICATIONS

M. W. Wang, et al., "Engineering the Nanostructure of Molybdenum Nitride Nanodots Embedded N-Doped Porous Hollow Carbon Nanochains for Rapid All pH Hydrogen Evolution", Journals of Materials Chemistry A, Royal Society of Chemistry, 2018, DOI: 10.1039/CBTA04684K; pp. 1-19.
(Continued)

*Primary Examiner* — Daniel C. McCracken
(74) *Attorney, Agent, or Firm* — Blank Rome LLP

(57) ABSTRACT

High quality carbon nanochains or carbon nanotubes are produced by methods that include mixing a carbon-containing feedstock with a catalyst to form a feedstock/catalyst mixture, or coating a catalyst with a carbon-containing feedstock, and subjecting the feedstock/catalyst mixture or feedstock-coated catalyst to irradiation with a laser to convert the feedstock into carbon nanochains or carbon nanotubes in the presence of the catalyst. In some instances, the feedstock is converted to a char by pyrolysis and the char is instead subjected to laser irradiation. The carbon-containing feedstock can be a biomass or a carbonaceous material. In some instances, the catalyst is a metal salt, preferably a transition metal salt. In some instances, the catalyst is an elemental metal, an alloy, or a combination thereof.

20 Claims, 11 Drawing Sheets

(52) U.S. Cl.
CPC .... *B01J 2219/02* (2013.01); *B01J 2219/0879* (2013.01); *B01J 2219/0892* (2013.01)

(58) Field of Classification Search
CPC .......... B01J 2219/0892; B01J 2219/12; B82Y 40/00; Y02P 20/145
See application file for complete search history.

(56) References Cited

U.S. PATENT DOCUMENTS

| | | | | |
|---|---|---|---|---|
| 11,380,895 | B2* | 7/2022 | Wagner | C01B 32/205 |
| 2010/0276644 | A1* | 11/2010 | Wolf | B82Y 30/00 |
| | | | | 252/500 |

OTHER PUBLICATIONS

M. Kumar, "Carbon Nanotube Synthesis and Growth Mechanism", Carbon Nanotubes—Synthesis, Characterization, Applications, Jul. 2011, pp. 147-170, ISBN: 978-953-307-497-9, InTech, http://www.intechopen.com/books/carbon-nanotubes-synthesis-characterization-applications/carbonnanotube-synthesis-and-growth-mechanism.

M. Qiao, et al., "Application of Yolk-Shell $Fe_3O_4$@N-doped Carbon Nanochains as Highly Effective Microwave-Absorption Material", Nano Research, http://doi.org/10.1007/s12274-017-1767-0; 2017; pp. 1-20.

S. F. Situ, et al., "Highly Efficient Antibacterial Iron Oxide@Carbon Nanochains from Wüstite Precursor Nanoparticles", ACS Applied Materials & Interfaces; American Chemical Society; 2014; vol. 6, pp. 20154-20163.

M. Zhang, et al., "Activated Carbon Nano-Chains with Tailored Micro-Meso Pore Structures and Their Application for Supercapacitors", The Journal of Physical Chemistry C; 2015; DOI: 10.1021/acs.jpcc.5b05480; pp. 1-38.

M. Zhang, et al., "Synthesis of Novel Carbon Nano-Chains and Their Application as Supercapacitors", Journal of Materials Chemistry A; vol. 2; 2014; pp. 16268-16275.

* cited by examiner

PRODUCTION OF CARBON NANOCHAINS AND NANOTUBES FROM BIOMASS

CROSS-REFERENCE TO RELATED APPLICATIONS

This application claims the benefit of U.S. Provisional Application No. 63/081,650, filed Sep. 22, 2020, the entire contents of which are incorporated by reference herein.

STATEMENT REGARDING FEDERALLY SPONSORED RESEARCH OR DEVELOPMENT

This invention was made with Government support under Grant/Contract No. NRO000-14-C-0335 awarded by the National Reconnaissance Office (NRO). The U.S. government may have certain rights in this invention.

FIELD OF THE INVENTION

The present invention relates to the synthesis of high purity carbon nanochains and carbon nanotubes from low-cost biomass (or other carbonaceous) starting materials. More specifically, the present invention relates to the synthesis of high purity carbon nanochains and carbon nanotubes from low-cost biomass (or other carbonaceous) starting materials via laser irradiation. The present invention also relates to the conversion of low-cost biomass (or other carbonaceous materials) to pyrolysis-oil, pyrolysis-gas and char, and the subsequent, or concurrent, conversion of char to high purity carbon nanochains and carbon nanotubes via laser irradiation.

BACKGROUND OF THE DISCLOSURE

Carbon nanotubes are very small tube-shaped structures essentially having a composition of a single graphene sheet or layers of graphene sheets in a tubular form. Carbon nanotubes have interesting and potentially useful electrical and mechanical properties and offer potential for various uses in electronic devices. Carbon nanotubes also feature extremely high electrical conductivity, very small diameters (much less than 100 nanometers), large aspect ratios (i.e. length/diameter ratios) (greater than 1000), and a tip-surface area near the theoretical limit (the smaller the tip-surface area, the more concentrated the electric field, and the greater the field enhancement factor). These features make carbon nanotubes ideal candidates for electron field emitters, light sources, lithium secondary batteries, hydrogen storage cells, transistors, and cathode ray tubes (CRTs).

Carbon nanochains consist of interconnected hollow carbon nano-onions (multilayer graphene shells) in a string-like manner (Zhang 2014, DOI 10.1039/c4ta02623c). Carbon nanochain research is in its infancy. They are of technological interest due to potential applications as components of capacitors (Zhang 2014 & 2015), microwave absorbers (Qiao 2017), antibacterial agents (Situ 2014) and hydrogen evolution materials (Wang 2018). In addition, a myriad of other applications can be envisioned including, but not limited to, as structural and conductive additive alternatives (to e.g. carbon nanotubes and carbon black), battery cathode materials (for e.g. Li-air batteries), anode materials for active metal batteries (e.g. lithium and lithium-ion batteries) to, for example, reduce dendrite growth, improve conductivity or structural integrity, or as a ion storage material, or other purposes, as a highly porous conductive materials into which sulfur, selenium or other element or combination of elements can be deposited (e.g. electrochemically, chemically, vapor or melt infusion, or other methods) for use as a cathode materials (for e.g. lithium or lithium-ion batteries), as highly porous, stable substrate material for catalysis with or without the addition of catalytic material (e.g. platinum, palladium or other metals, alloys, compounds or other materials), and as a highly porous absorbent (e.g. for oils and other organic substances).

DETAILED DESCRIPTION

Figure 1:
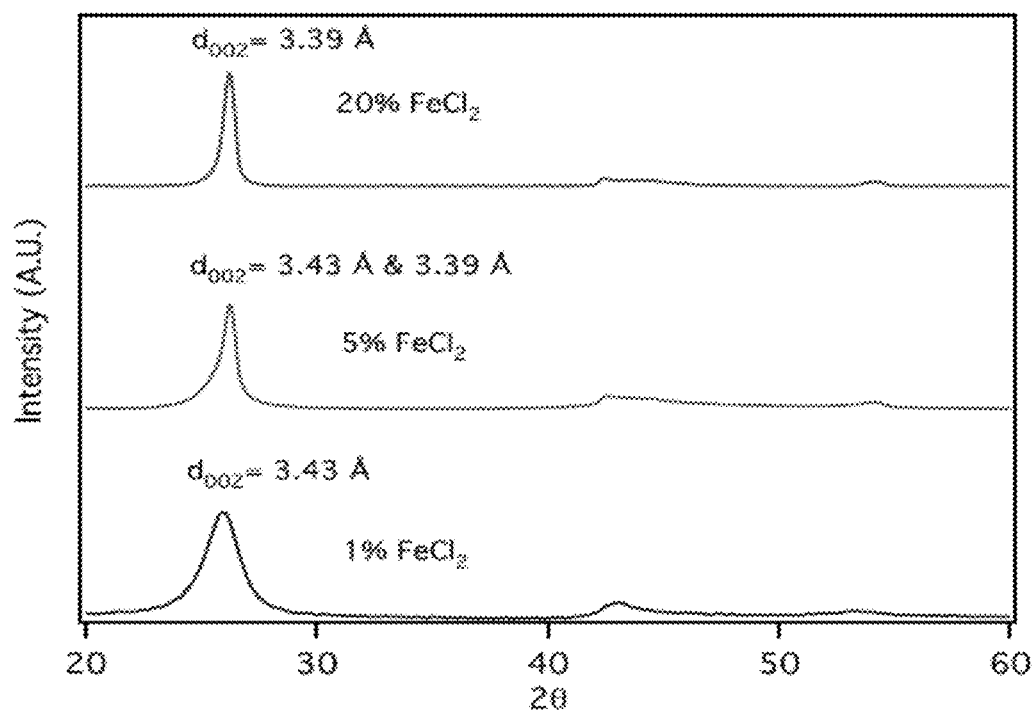
FIG. 1 shows powder x-ray diffractograms of carbon nanostructures made according to various aspects of the disclosure with 20 wt % (top), 5 wt % (middle) and 1 wt % (bottom) $FeCl_2 \cdot 4H_2O$ catalyst.

The following description of the embodiments is merely exemplary in nature and is in no way intended to limit the subject matter of the present disclosure, their application, or uses.

As used throughout, ranges are used as shorthand for describing each and every value that is within the range. Any value within the range can be selected as the terminus of the range. Unless otherwise specified, all percentages and amounts expressed herein and elsewhere in the specification should be understood to refer to percentages by weight.

For the purposes of this specification and appended claims, unless otherwise indicated, all numbers expressing quantities, percentages or proportions, and other numerical values used in the specification and claims, are to be understood as being modified in all instances by the term "about." The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of +10 percent, alternatively +5 percent, and alternatively +1 percent of the given numeric value provided such a deviation does not alter the end function or result of the value. Accordingly, unless indicated to the contrary, the numerical parameters set forth in this specification and attached claims are approximations that can vary depending upon the desired properties sought to be obtained by the present invention.

It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. For example, as used in this specification and the following claims, the terms "comprise" (as well as forms, derivatives, or variations thereof, such as ".comprising" and "comprises"), "include" (as well as forms, derivatives, or variations thereof, such as "including" and "includes") and "has" (as well as forms, derivatives, or variations thereof, such as "having" and "have") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The present invention relates to the synthesis of high purity carbon nanochains or carbon nanotubes from low-cost biomass (or other carbonaceous) starting materials in the presence of a catalyst. More specifically, the present invention relates to the synthesis of high purity high purity carbon nanochains or carbon nanotubes from low-cost biomass (or other carbonaceous) starting materials in the presence of a catalyst via laser irradiation. In some instances, the present invention relates to the conversion of low-cost biomass (or other carbonaceous materials) to pyrolysis-oil, pyrolysis-gas (syngas) and char (biochar or carbonaceous char), and the subsequent conversion of char to high purity carbon nanochains or carbon nanotubes in the presence of a catalyst via laser irradiation.

Methods according to various aspects of the present disclosure produce high purity, high purity carbon nanochains or carbon nanotubes from any suitable biomass or carbonaceous feedstock such as agricultural, industrial/municipal waste or energy crops. In some instances, a suitable biomass feedstock can be, but is not limited to, lignin, lignocellulose, microcrystalline cellulose, wood flour or sawdust, dehydrated agricultural products such corn stover (i.e., cobs, stalks and leaves), dehydrated food waste, dehydrated livestock feces, *miscanthus*, switchgrass, hemp, poplar, willow, sorghum, sugarcane, bamboo, agave, alfalfa, grains (for example, barley, corn, oats rye, wheat), algae, oil palm, or any combination of the foregoing. Other graphitizable and non-graphitizable carbonaceous materials can also be used as feedstocks for high purity carbon nanochains or carbon nanotubes formation including artificial and natural polymers, plastics, peat, coal, pitch, coke, carbon blacks, activated carbons, mesophase carbons, charcoal, or any combination of the foregoing. Any combination of the above materials, biomass or otherwise, could be used as well.

The conversion of char to high purity carbon nanochains takes place in the presence of a catalyst. Generally, catalysts used for carbon nanochains formation in accordance with the present disclosure are metal salts, preferably transition metal salts. The transition metal salts can include any one of titanium (Ti), zirconium (Zr) or hafnium (Hf), vanadium (V), chromium (Cr), molybdenum (Mo) tungsten (W), iron (Fe), ruthenium (Ru), manganese (Mn) rhenium (Rh), palladium (Pd), platinum (Pt), copper (Cu), silver (Ag), gold (Au), zinc (Zn), or cadmium (Cd). Preferably, the transition metal salt includes Ti, V, Cr, Mn, Fe, Co, Ni or Cu. The transition metal salts can be any one of halides, oxohalides, nitrates, nitrides, oxynitrides, sulfides, sulfates, cyanides, thiocyanates, cyanates, phosphates, phosphites, phosphides, acetates, hydroxides, carbonates and hydrides. Preferably, the transition metal salts are transition metal halides, such as chlorides or bromides. The transition metal salts can be anhydrous or hydrates.

The conversion of char to high purity carbon nanotubes takes place in the presence of a catalyst. Generally, catalysts used for carbon nanotube formation in accordance with the present disclosure are metals in their elemental state or an alloy. The catalyst used can be any suitable elemental metal, combination of metals, alloy, combination of alloys, or combination of alloy(s) and metal(s). In some instances, the elemental metal can be any one of iron (Fe), cobalt (Co) and nickel (Ni). In other instances, the elemental metal can be any one of titanium (Ti), zirconium (Zr) or hafnium (Hf). In other instances, the elemental metal can be any one of vanadium (V), chromium (Cr), molybdenum (Mo) or tungsten (W). In yet other instances, the elemental metal can be any one of ruthenium (Ru), rhenium (Rh), manganese (Mn), palladium (PD) or platinum (Pt). In yet other instances, the elemental metal can be any one of copper (Cu), silver (Ag) or gold (Au). In yet other instances the elemental metal can be zinc (Zn) or cadmium (Cd). In yet other instances, the elemental metal can be any one of aluminum (Al), gallium (Ga), indium (In), tin (Sn) or lead (Pb).

In some instances, the alloy used for carbon nanotube formation is a steel. In some instances, the alloy can be a bronze or a brass. In some instances, the alloy be an aluminum alloy having one or more of calcium, cerium, copper, germanium, gold, indium, iron, magnesium, nickel, platinum, silicon, thorium and zinc. In some instances, the alloy can be an arsenic alloy having one or more of antimony, cobalt, copper, indium, iron, manganese, nickel, tin and zinc. In some instances, the alloy can be a beryllium-copper alloy. In some instance, the alloy can be a copper alloy having one or more of nickel, silver, tin and zinc. In some instances, the alloy can be an iron alloy having one or more of antimony, gadolinium, molybdenum, niobium, silicon, tin, yttrium and zirconium. In some instances, the alloy can be a nickel alloy having one or more of antimony, chromium, iron thorium, tin, titanium, tungsten, vanadium, and zinc. In some instances, the alloy can be a cobalt alloy having one or more of chromium, tungsten, nickel, molybdenum and titanium.

The catalysts used for carbon nanotube formation can be in the form of a powder, grains, spheres, flakes, or any other suitable shape. In instances where the catalyst is in the form of a powder, grains or spheres, each individual elemental metal unit (e.g. individual particle, grain, sphere) may have a diameter on the ranging from nanometers up to about 100 micrometers, preferably up to about 75 micrometers, more preferably up to about 50 micrometers, even more preferably up to about 25 micrometers, and even more preferably up to about 10 micrometers.

The laser used for irradiating mixtures of biomass or carbonaceous feedstock and catalyst can be any laser capable of decomposing the biomass/carbonaceous feedstock to form carbon nanostructure (i.e., nanochain and nanotube) precursors and to at least partially melt the catalyst. In accordance with various aspects of the present disclosure, the laser used can be any one of an ultraviolet (UV), visible or ultraviolet emitting laser such as, for example, an excimer laser (uses reactive gases such as chlorine and fluorine mixed with inert gases such as argon, krypton, or xenon), an infrared (IR) emitting laser such as, for example, a solid state ruby or neodymium-YAG (yttrium aluminum garnet) laser, and a gas laser such as, for example, a helium laser, a helium-neon laser and CO laser or a $CO_2$ laser, a fiber laser, a dye laser, a semiconductor laser, a hydrogen fluoride laser, a deuterium fluoride laser, a chemical oxygen-iodine (COIL) laser, an all gas-phase iodine laser (Agil), a NdCrYAG laser, a Er:YAG laser, a holmium YAG (Ho:YAG) laser, and a gas dynamic laser. In some instances, the laser is a continuous wave laser. In other instances, the laser is a single pulsed (commonly known as a long pulse or normal mode) laser. In yet other instances, the laser can be a single pulsed Q-switched laser. In yet other instances, the laser can be a repetitively pulsed or scanning laser. In yet other instances, the laser can be a mode locked laser. Lasers used in accordance with various aspects of the present disclosure can have a continuous or pulsed wave power ranging from about 15 watts to about 12,000 watts (or higher), at power densities equal to or greater than 50 watts of laser power per gram (W/g) of feedstock/catalyst mixture irradiated at any instant and up to about 3,600,000 W/g, heating the feedstock/catalyst mixture or any component thereof at a rate larger than 20° C. per second, preferably larger than 100° C. per second, more preferably larger than 1000° C., and even more preferably larger than 1500° C. per second, and emit radiation at wavelengths ranging from 10 nanometers to 15 micrometers. In some instances power densities equal to or greater than 100 W/g are preferred. In some instances power densities equal to or greater than 200 W/g are preferred. In some instances power densities equal to or greater than 500 W/g are preferred. In some instances power densities equal to or greater than 1000 W/g are preferred. In some instances power densities equal to or greater than 2500 W/g are preferred. In some instances power densities equal to or greater than 5000 W/g are preferred. In some instances power densities equal to or greater than 6000 W/g are preferred. As described below in various embodiments, the laser and the feedstock/catalyst mixture are moved relative to each other during irradiation.

The feedstock/catalyst mixture, which can be in powder form, is then subjected to laser irradiation. While not being bound to any particular theory, it is believed that the laser heats feedstock/catalyst mixture, transforming the catalyst to a molten state and decomposing some portion of the feedstock into carbon nanostructure precursors, such as polyaromatics, whereupon the molten catalyst effects the transformation of the feedstock into graphene layers, translating through the largely stationary feedstock over time, possibly through pores in the feedstock, to transform the feedstock into carbon nanochains or carbon nanotubes. The formed carbon nanostructures are then chemically or physically separated from unreacted (or non-irradiated) portions of the mixture and purified.

In accordance with various aspects of the present disclosure, high purity carbon nanochains or carbon nanotubes can also be produced using the following method. First, the biomass and/or carbonaceous feedstock is combined with the catalyst, to form a feedstock/catalyst mixture, either dry or in the presence of liquid (e.g. to dissolve the catalyst where soluble, or to facilitate mixing). Preferably, the feedstock/catalyst mixture is sufficiently mixed to ensure the catalysts in homogenously dispersed within the feedstock. Optionally, the mixture can be ground, milled or pulverized to form a powder. In some instances, the powder can comprise mesh size granules ranging from, for example, 500 U.S. mesh or lower to 3.5 U.S. mesh or higher. In some instances, the powder can comprise granules having diameters of about 2 mm or larger. In some instances, the powder can comprise granules having diameters of about 2.5 μm or smaller.

When the preparation of carbon nanochains is desired, the mixture has a feedstock to catalyst (metal salt) ratio ranging from about 90:10 to about 99.9:0.1 by weight. In other instances, the mixture has a feedstock to catalyst ratio ranging from about 91:9 to about 99.85:0.15 by weight. In yet other instances, the mixture has a feedstock to catalyst ratio ranging from about 92:8 to about 99.8:0.2 by weight, alternatively from about 93:7 to about 99.9:0.1 by weight, alternatively from about 93:7 to about 99.7:0.3 by weight, alternatively from about 94:6 to about 99.6:0.4 by weight, alternatively from about 95:5 to about 99.5:0.5 by weight, alternatively from about 96:4 to about 99.75:0.25 by weight, alternatively from about 97:3 to about 99.85:0.15 by weight, alternatively from about 98.5:1.5 to about 99.85:0.15 by weight and alternatively from about 98:2 to about 99:1 by weight or 99.5:0.5.

When the preparation of carbon nanotubes is desired, the mixture has a feedstock to catalyst (elemental metal or alloy) ratio ranging from about 90:10 to about 99.9:0.1 by weight. In other instances, the mixture has a feedstock to catalyst ratio ranging from about 91:9 to about 99.85:0.15 by weight. In yet other instances, the mixture has a feedstock to catalyst ratio ranging from about 92:8 to about 99.8:0.2 by weight, alternatively from about 93:7 to about 99.9:0.1 by weight, alternatively from about 93:7 to about 99.7:0.3 by weight, alternatively from about 94:6 to about 99.6:0.4 by weight, alternatively from about 95:5 to about 99.5:0.5 by weight, alternatively from about 96:4 to about 99.75:0.25 by weight, alternatively from about 97:3 to about 99.85:0.15 by weight, alternatively from about 98.5:1.5 to about 99.85:0.15 by weight and alternatively from about 98:2 to about 99:1 by weight.

The feedstock/catalyst mixture is then compressed or otherwise processed (for example, by extrusion) into a solid form. The solid form can take any suitable size and substantially two-dimensional or three-dimensional regular or irregular shape. Non-limiting examples of two-dimensional solid form shapes are a board, a sheet, a plate, and a disc. Non-limiting examples of three-dimensional solid form shapes can be a powder, a pellet, a rod, a cylinder, a cuboid, a triangular prism, a pyramid, a sphere, and an ovoid.

The solid form of feedstock/catalyst mixture is then subjected to laser irradiation. The laser heats the solid form of feedstock/catalyst mixture, melting the catalyst and decomposing some portion of the feedstock into carbon nanostructure (i.e., carbon nanochain or carbon nanotube) precursors, such as polyaromatics. While not being bound to any particular theory, it is believed that the melted catalyst adsorbs or absorbs carbon or carbonaceous species from the feedstock or decomposed products thereof, depositing them in the form of graphene layers. The initial graphene layer is formed at the surface of the molten catalyst, while each additional layer is formed interior to the former, compressing the space in which the molten catalyst resides. It is possible that complete shells form a first link of a nanochain or first lengthwise portion of a nanotube and are ruptured by the internal pressure on the molten catalyst, depositing the molten catalyst adjacent to the ruptured shell. The molten catalyst then adsorbs or absorbs new carbon or carbonaceous species from the feedstock or decomposed products thereof, depositing them in the form of graphene layers to form the next shell in a second nanochain (connected to the first nanochain) or second lengthwise portion of a nanotube (connected to the first lengthwise portion of a nanotube), depending on the particular type of catalyst used. This process continues in a stepwise additive fashion to produce carbon nanochains or carbon nanotubes on a bulk scale. It seems likely that the catalyst is not fully confined, but rather forms an open tube or sphere of multilayer graphene walls. Movement or elongation/contraction, possibly repetitive as discussed above, of the molten catalyst allows it to absorb or adsorb additional carbon or carbonaceous species for further graphene wall growth, akin to the mechanisms by which carbon nanotubes are thought to form when synthesized by chemical vapor deposition (reference Kumar, M., Carbon Nanotube Synthesis and Growth Mechanism in *Carbon Nanotubes—Synthesis, Characterization, Applications*, edited by S. Yellampalli (Intech, 2011), pp. 147-170. ISBN 978-953-307-497-9).

The formed carbon nanostructure is then chemically or physically separated from unreacted (or non-irradiated) portions of the solid form and optionally purified. In some instances the laser can be immobile and the solid form can be rotated or translated along an axis (or one or more axes) thereof and/or rastered relative to the laser. That is, the solid form (and any underlying thermally stable substrate if present) can be rotated around a first axis and/or moved along a second axis (preferably, orthogonal to the first axis) or one or more axes relative to the laser such that the laser irradiates one or more sides of the solid form from top to bottom in lines from side to side. In other instances, the solid form (and any underlying thermally stable substrate) is immobile and the laser is configured to move. In such instances, the laser moves to irradiate the solid form from side to side in lines from top to bottom. In other instances, the solid form (and any underlying thermally stable substrate) and the laser both move relative to one another, such as, for instance, the simultaneous translation (and or rotation) of the solid form and laser movement from side to side. Alternatively, the solid form, particularly if in a three-dimensional and/or powder form, can be made to pass through the laser light by pouring, blowing, pushing, pulling or other suitable method to cause its translation and or rotation.

In some methods described herein, carbon nanochains or carbon nanotubes are formed by laser irradiation of a mixture of a biomass or carbonaceous feedstock and a catalyst. In other methods described herein, a mixture of a biomass or carbonaceous feedstock and a catalyst is first subjected to pyrolysis to form a mixture of char and catalyst. In either methodology, to form either carbon nanochains or carbon nanotubes, the volume of all or substantially all individual particles of the catalyst should be smaller than the volume of all or substantially all individual particles of the granules of biomass/carbonaceous feedstock or char in the resulting bulk feedstock (or char)/catalyst mixture formed in the methods below. In some instances, the volume of the individual particles of the catalyst is at most 50% of the volume of the individual resulting granules of biomass/carbonaceous feedstock or char in the resulting bulk feedstock (or char)/catalyst mixture formed in the methods below. In some instances, the volume of the individual particles of the catalyst is at most 60% of the volume of the individual granules of biomass/carbonaceous feedstock or char in the resulting bulk feedstock (or char)/catalyst mixture formed in the methods below. In some instances, the volume of the individual particles of the catalyst is at most 70% of the volume of the individual granules of biomass/carbonaceous feedstock or char in the resulting bulk feedstock (or char)/catalyst mixture formed in the methods below. In some instances, the volume of the individual particles of the catalyst is at most 80% of the volume of the individual granules of biomass/carbonaceous feedstock or char in the resulting bulk feedstock (or char)/catalyst mixture formed in the methods below. In some instances, the volume of the individual particles of the catalyst is at most 90°/% of the volume of the individual granules of biomass/carbonaceous feedstock or char in the resulting bulk feedstock (or char)/catalyst mixture formed in the methods below. In some instances, the volume of the individual particles of the catalyst is at most 95% of volume of the individual of the granules of biomass/carbonaceous feedstock or char in the resulting bulk feedstock (or char)/catalyst mixture formed in the methods below. Without being bound to any particular theory, it is believed that using catalysts with particles of smaller volume than the granules of biomass/carbonaceous feedstock or char in the bulk feedstock (or char)/catalyst mixture allows for the catalyst to enter into pores of the bulk char, for example by capillary action, and be confined to those pores to form chains or tubes, rather than hollow carbon nanospheres or graphite.

In accordance with various aspects of the present disclosure, high purity carbon nanochains or carbon nanotubes can also be produced using the following method. First, the biomass and/or carbonaceous feedstock is combined with the catalyst, either dry or in the presence of liquid (e.g. to dissolve the catalyst where soluble, or to facilitate mixing), to form a feedstock/catalyst mixture. Preferably, the feedstock/catalyst mixture is sufficiently mixed to ensure the catalysts in homogenously dispersed within the feedstock. Optionally, the mixture can be ground, milled or pulverized to form a powder. The size of granules within the powder is not particularly limiting. The powder can range from very fine to very coarse. In some instances, the powder can comprise mesh size granules ranging from, for example, 500 U.S. mesh or lower to 3.5 U.S. mesh or higher. In some instances, the powder can comprise granules having diameters of about 2 mm or larger. In some instances, the powder can comprise granules having diameters of about 2.5 µm or smaller.

When the preparation of carbon nanochains is desired, the mixture has a feedstock to catalyst (metal salt) ratio ranging from about 90:10 to about 99.9:0.1 by weight. In other instances, the mixture has a feedstock to catalyst ratio ranging from about 91:9 to about 99.85:0.15 by weight. In yet other instances, the mixture has a feedstock to catalyst ratio ranging from about 92:8 to about 99.8:0.2 by weight, alternatively from about 93:7 to about 99.9:0.1 by weight, alternatively from about 93:7 to about 99.7:0.3 by weight, alternatively from about 94:6 to about 99.6:0.4 by weight, alternatively from about 95:5 to about 99.5:0.5 by weight, alternatively from about 96:4 to about 99.75:0.25 by weight, alternatively from about 97:3 to about 99.85:0.15 by weight, alternatively from about 98.5:1.5 to about 99.85:0.15 by weight and alternatively from about 98:2 to about 99:1 by weight.

When the preparation of carbon nanotubes is desired, the mixture has a feedstock to catalyst (elemental metal of alloy) ratio ranging from about 90:10 to about 99.9:0.1 by weight. In other instances, the mixture has a feedstock to catalyst ratio ranging from about 91:9 to about 99.85:0.15 by weight. In yet other instances, the mixture has a feedstock to catalyst ratio ranging from about 92:8 to about 99.8:0.2 by weight, alternatively from about 93:7 to about 99.9:0.1 by weight, alternatively from about 93:7 to about 99.7:0.3 by weight, alternatively from about 94:6 to about 99.6:0.4 by weight, alternatively from about 95:5 to about 99.5:0.5 by weight, alternatively from about 96:4 to about 99.75:0.25 by weight, alternatively from about 97:3 to about 99.85:0.15 by weight, alternatively from about 98.5:1.5 to about 99.85:0.15 by weight and alternatively from about 98:2 to about 99:1 by weight.

The mixture is then formed into a sheet or layer on a thermally stable substrate. The mixture can be compressed on a thermally stable substrate to form a sheet or layer using any suitable means known in the art such as, for example, industrial sheet press or roller press assemblies. Alternatively, the mixture can be deposited on a thermally stable substrate to form a sheet or layer using any suitable means known in the art such as, for example, coating as a slurry, spraying or by extrusion.

The sheet or layer is then subjected to laser irradiation. While not being bound to any particular theory, it is believed that the laser heats feedstock/catalyst mixture, transforming the catalyst to a molten state and decomposing some portion of the feedstock into carbon nanostructure precursors, such as polyaromatics, whereupon the molten catalyst effects the transformation of the feedstock into graphene layers, translating through the largely stationary feedstock over time, possibly through pores in the feedstock, to transform the feedstock into carbon nanochains or carbon nanotubes. The formed carbon nanostructure is then chemically or physically separated from unreacted (or non-irradiated) portions of the sheet or layer and optionally purified. In some instances the laser can be immobile and the sheet or layer can be rastered relative to the laser. That is, the sheet or layer (and any underlying thermally stable substrate) can be moved relative to the laser such that the laser irradiates the sheet or layer from side to side in lines from top to bottom. In other instances, the sheet or layer (and any underlying thermally stable substrate) is immobile and the laser is configured to move. In such instances, the laser moves to irradiate the immobile sheet or layer from side to side in lines from top to bottom. In other instances, the sheet or layer (and the underlying thermally stable substrate) and the laser both move relative to one another, such as, for instance, the simultaneous translation (and or rotation) of the sheet or layer and laser movement from side to side.

In accordance with various aspects of the present disclosure, high purity carbon nanochains or carbon nanotubes can also be produced using the following method. First, the biomass and/or carbonaceous feedstock is coated onto the catalyst, to form a sheet or layer of feedstock on the catalyst. Optionally, the carbonaceous material feedstock can be ground, milled or pulverized prior to coating. Optionally, the carbonaceous material feedstock can be ground, milled or pulverized into a powder prior to coating to provide better homogeneity. The catalyst can be any suitable size and substantially two-dimensional or three-dimensional regular or irregular shape. Non-limiting examples of two-dimensional solid form shapes are a board, a sheet, a plate, or a disc. Non-limiting examples of three-dimensional solid form shapes are a pellet, a rod, a cylinder, a cuboid, a triangular prism, a pyramid, a sphere, and an ovoid. The feedstock can be deposited on the catalyst to form a sheet or layer using any suitable means known in the art such as, for example, coating as a slurry, spraying or by extrusion. Optionally, the feedstock-coated catalyst can be compressed to compress the feedstock, forming the feedstock into a compressed sheet or layer on the catalyst. Compression of the feedstock-coated catalyst can be accomplished using any suitable means known in the art such as, for example, an industrial sheet press or a roller press assembly.

The feedstock-coated catalyst is then subjected to laser irradiation. While not being bound to any particular theory, it is believed that the laser heats the feedstock-coated catalyst, melts the surface of the catalyst and decomposes the feedstock into carbon nanostructure (i.e., carbon nanochain or carbon nanotube) precursors, such as polyaromatics, and the carbon nanostructure precursors are absorbed onto a surface of the melted catalyst. The surface of the melted catalyst onto which the carbon nanostructure precursors are absorbed then initiates the precipitation and growth of the carbon nanostructure thereon. The formed carbon nanostructure is then chemically or physically separated from unreacted (or non-irradiated) portions of the feedstock sheet or layer and optionally purified. In some instances, the laser can be immobile and the feedstock-coated catalyst can be rastered relative to the laser. That is, the feedstock-coated catalyst (and any underlying thermally stable substrate) can be moved relative to the laser such that the laser irradiates the sheet or layer from side to side in lines from top to bottom. In other instances, the feedstock-coated catalyst (and any underlying thermally stable substrate) is immobile and the laser is configured to move. In such instances, the laser moves to irradiate the immobile feedstock-coated catalyst from side to side in lines from top to bottom. In other instances, the feedstock-coated catalyst (and the underlying thermally stable substrate) and the laser both move relative to one another, such as, for instance, the simultaneous translation (and/or rotation) of the feedstock-coated catalyst and laser movement from side to side.

In accordance with various aspects of the present disclosure, high purity carbon nanochains or nanotubes can also be produced using the following method. First, the biomass and/or carbonaceous feedstock is combined with the catalyst, to form a feedstock/catalyst mixture. Preferably, the feedstock/catalyst mixture is sufficiently mixed to ensure the catalysts in homogenously dispersed within the feedstock. Preferably, the feedstock/catalyst mixture is sufficiently mixed to ensure the catalysts in homogenously dispersed within the feedstock. Optionally, the mixture can be ground, milled or pulverized to form a powder. The size of granules within the powder is not particularly limiting. The powder can range from very fine to very coarse. In some instances, the powder can comprise mesh size granules ranging from, for example, 500 U.S. mesh or lower to 3.5 U.S. mesh or higher. In some instances, the powder can comprise granules having diameters of about 2 mm or larger. In some instances, the powder can comprise granules having diameters of about 2.5 µm or smaller.

When the preparation of carbon nanochains is desired, the mixture has a feedstock to catalyst (metal salt) ratio ranging from about 90:10 to about 99.9:0.1 by weight. In other instances, the mixture has a feedstock to catalyst ratio ranging from about 91:9 to about 99.85:0.15 by weight. In yet other instances, the mixture has a feedstock to catalyst ratio ranging from about 92:8 to about 99.8:0.2 by weight, alternatively from about 93:7 to about 99.9:0.1 by weight, alternatively from about 93:7 to about 99.7:0.3 by weight, alternatively from about 94:6 to about 99.6:0.4 by weight, alternatively from about 95:5 to about 99.5:0.5 by weight, alternatively from about 96:4 to about 99.75:0.25 by weight, alternatively from about 97:3 to about 99.85:0.15 by weight, alternatively from about 98.5:1.5 to about 99.85:0.15 by weight and alternatively from about 98:2 to about 99:1 by weight.

When the preparation of carbon nanotubes is desired, the mixture has a feedstock to catalyst (elemental metal of alloy) ratio ranging from about 90:10 to about 99.9:0.1 by weight. In other instances, the mixture has a feedstock to catalyst ratio ranging from about 91:9 to about 99.85:0.15 by weight. In yet other instances, the mixture has a feedstock to catalyst ratio ranging from about 92:8 to about 99.8:0.2 by weight, alternatively from about 93:7 to about 99.9:0.1 by weight, alternatively from about 93:7 to about 99.7:0.3 by weight, alternatively from about 94:6 to about 99.6:0.4 by weight, alternatively from about 95:5 to about 99.5:0.5 by weight, alternatively from about 96:4 to about 99.75:0.25 by weight, alternatively from about 97:3 to about 99.85:0.15 by weight, alternatively from about 98.5:1.5 to about 99.85:0.15 by weight and alternatively from about 98:2 to about 99:1 by weight.

The feedstock/catalyst mixture is then subjected to pyrolysis (e.g., slow or fast pyrolysis) to convert the mixture to a catalyst-containing char, pyrolysis-oil and pyrolysis-gas (syngas). Pyrolysis can be performed at a temperature ranging from about 200 to about 1500° C., alternatively from about 200 to about 1200° C., alternatively from about 250 to about 1000° C., and alternatively about 400 to about 1000° C. The pyrolysis-oil and pyrolysis-gas are then removed as waste or saved for use in other applications. The catalyst-containing char is then subjected to laser irradiation. While not being bound to any particular theory, it is believed that the laser heats the catalyst-containing char to a molten state, decomposing carbon-containing constituents of the catalyst-containing char into carbon nanostructure (i.e., carbon nanochain or carbon nanotube) precursors, such as polyaromatics, and the carbon nanostructure precursors are absorbed onto the melted catalyst. It is further believed that the melted catalyst then initiates the precipitation and growth of the carbon nanostructure thereon. The formed carbon nanostructure is then chemically or physically separated from unreacted (or non-irradiated) portions of the biochar and optionally purified.

In accordance with various aspects of the present disclosure, high purity carbon nanochains or carbon nanotubes can also be produced using the following method. First, the biomass and/or carbonaceous feedstock is combined with the catalyst, to form a feedstock/catalyst mixture, either dry or in the presence of liquid (e.g. to dissolve the catalyst where soluble, or to facilitate mixing). Preferably, the feedstock/catalyst mixture is sufficiently mixed to ensure the catalysts in homogenously dispersed within the feedstock. Optionally, the mixture can be ground, milled or pulverized to form a powder. The size of granules within the powder is not particularly limiting. The powder can range from very fine to very coarse. In some instances, the powder can comprise mesh size granules ranging from, for example, 500 U.S. mesh or lower to 3.5 U.S. mesh or higher. In some instances, the powder can comprise granules having diameters of about 2 mm or larger. In some instances, the powder can comprise granules having diameters of about 2.5 µm or smaller.

When the preparation of carbon nanochains is desired, the mixture has a feedstock to catalyst (metal salt) ratio ranging from about 90:10 to about 99.9:0.1 by weight. In other instances, the mixture has a feedstock to catalyst ratio ranging from about 91:9 to about 99.85:0.15 by weight. In yet other instances, the mixture has a feedstock to catalyst ratio ranging from about 92:8 to about 99.8:0.2 by weight, alternatively from about 93:7 to about 99.9:0.1 by weight, alternatively from about 93:7 to about 99.7:0.3 by weight, alternatively from about 94:6 to about 99.6:0.4 by weight, alternatively from about 95:5 to about 99.5:0.5 by weight, alternatively from about 96:4 to about 99.75:0.25 by weight, alternatively from about 97:3 to about 99.85:0.15 by weight, alternatively from about 98.5:1.5 to about 99.85:0.15 by weight and alternatively from about 98:2 to about 99:1 by weight.

When the preparation of carbon nanotubes is desired, the mixture has a feedstock to catalyst (elemental metal of alloy) ratio ranging from about 90:10 to about 99.9:0.1 by weight. In other instances, the mixture has a feedstock to catalyst ratio ranging from about 91:9 to about 99.85:0.15 by weight. In yet other instances, the mixture has a feedstock to catalyst ratio ranging from about 92:8 to about 99.8:0.2 by weight, alternatively from about 93:7 to about 99.9:0.1 by weight, alternatively from about 93:7 to about 99.7:0.3 by weight, alternatively from about 94:6 to about 99.6:0.4 by weight, alternatively from about 95:5 to about 99.5:0.5 by weight, alternatively from about 96:4 to about 99.75:0.25 by weight, alternatively from about 97:3 to about 99.85:0.15 by weight, alternatively from about 98.5:1.5 to about 99.85:0.15 by weight and alternatively from about 98:2 to about 99:1 by weight.

The feedstock/catalyst mixture is then compressed or otherwise processed (for example, by extrusion) into a solid form. The solid form can take any suitable size and substantially two-dimensional or three-dimensional regular or irregular shape. Non-limiting examples of two-dimensional solid form shapes can be a board, a sheet, a plate, and a disc. Non-limiting examples of three-dimensional solid form shapes can be a pellet, a rod, a cylinder, a cuboid, a triangular prism, a pyramid, a sphere, and an ovoid. The solid form is then subjected to pyrolysis (e.g., slow or fast pyrolysis) to convert the solid form to a catalyst-containing char, pyrolysis-oil and pyrolysis-gas. Pyrolysis can be performed at a temperature ranging from about 200 to about 1500° C., alternatively from about 200 to about 1200° C., alternatively from about 250 to about 1000° C., and alternatively about 400 to about 1000° C. The pyrolysis-oil and pyrolysis-gas are then removed as waste or saved for use in other applications. The catalyst-containing char is then subjected to laser irradiation. While not being bound to any particular theory, it is believed that the laser heats the catalyst-containing char to a molten state, decomposing carbon-containing constituents of the catalyst-containing char into graphite precursors, such as polyaromatics, and the graphite precursors are absorbed onto the melted catalyst. It is further believed that the melted catalyst then initiates the precipitation and growth of graphite thereon. The formed graphite is then chemically or physically separated from unreacted (or non-irradiated) portions of the char and optionally purified. In some instances the laser can be immobile and the catalyst-containing char can be rotated or translated along an axis thereof and/or rastered relative to the laser. That is, the char (and any underlying thermally stable substrate) can be rotated around a first axis and/or moved along a second axis (preferably, orthogonal to the first axis) relative to the laser such that the laser irradiates one or more sides of the char from top to bottom in lines from side to side. In other instances, the char (and any underlying thermally stable substrate) is immobile and the laser is configured to move. In such instances, the laser moves to irradiate the immobile char from side to side in lines from top to bottom. Alternatively, the char, particularly if in a three-dimensional or powder form, can be made to pass through the laser light by pouring, blowing, pushing or other suitable method to cause its translation and/or rotation.

In accordance with various aspects of the present disclosure, high purity carbon nanochains or carbon nanotubes can also be produced using the following method. First, the biomass and/or carbonaceous feedstock is combined with the catalyst, to form a feedstock/catalyst mixture, either dry or in the presence of liquid (e.g. to dissolve the catalyst where soluble, or to facilitate mixing). Preferably, the feedstock/catalyst mixture is sufficiently mixed to ensure the catalysts in homogenously dispersed within the feedstock. Optionally, the mixture can be ground, milled or pulverized to form a powder. The size of granules within the powder is not particularly limiting. The powder can range from very fine to very coarse. In some instances, the powder can comprise mesh size granules ranging from, for example, 500 U.S. mesh or lower to 3.5 U.S. mesh or higher. In some instances, the powder can comprise granules having diameters of about 2 mm or larger. In some instances, the powder can comprise granules having diameters of about 2.5 µm or smaller.

When the preparation of carbon nanochains is desired, the mixture has a feedstock to catalyst (metal salt) ratio ranging from about 90:10 to about 99.9:0.1 by weight. In other instances, the mixture has a feedstock to catalyst ratio ranging from about 91:9 to about 99.85:0.15 by weight. In yet other instances, the mixture has a feedstock to catalyst ratio ranging from about 92:8 to about 99.8:0.2 by weight, alternatively from about 93:7 to about 99.9:0.1 by weight, alternatively from about 93:7 to about 99.7:0.3 by weight, alternatively from about 94:6 to about 99.6:0.4 by weight, alternatively from about 95:5 to about 99.5:0.5 by weight, alternatively from about 96:4 to about 99.75:0.25 by weight, alternatively from about 97:3 to about 99.85:0.15 by weight, alternatively from about 98.5:1.5 to about 99.85:0.15 by weight and alternatively from about 98:2 to about 99:1 by weight.

When the preparation of carbon nanotubes is desired, the mixture has a feedstock to catalyst (elemental metal of alloy) ratio ranging from about 90:10 to about 99.9:0.1 by weight. In other instances, the mixture has a feedstock to catalyst ratio ranging from about 91:9 to about 99.85:0.15 by weight. In yet other instances, the mixture has a feedstock to catalyst ratio ranging from about 92:8 to about 99.8:0.2 by weight, alternatively from about 93:7 to about 99.9:0.1 by weight, alternatively from about 93:7 to about 99.7:0.3 by weight, alternatively from about 94:6 to about 99.6:0.4 by weight, alternatively from about 95:5 to about 99.5:0.5 by weight, alternatively from about 96:4 to about 99.75:0.25 by weight, alternatively from about 97:3 to about 99.85:0.15 by weight, alternatively from about 98.5:1.5 to about 99.85:0.15 by weight and alternatively from about 98:2 to about 99:1 by weight.

The feedstock/catalyst mixture is then formed into a sheet or layer on a thermally stable substrate. The mixture can be compressed on the thermally stable substrate to form a sheet or layer using any suitable means known in the art such as, for example, an industrial sheet press or a roller press assembly. Alternatively, the mixture can be deposited on the thermally stable substrate to form a sheet or layer using any suitable means known in the art such as, for example, coating as a slurry, spraying or by extrusion. The sheet or layer is then subjected to pyrolysis (e.g., slow or fast pyrolysis) to convert the mixture to a catalyst-containing char, pyrolysis-oil and pyrolysis-gas. Pyrolysis can be performed at a temperature ranging from about 200 to about 1500° C., alternatively from about 200 to about 1200° C., alternatively from about 250 to about 1000° C., and alternatively about 400 to about 1000° C. The pyrolysis-oil and pyrolysis-gas are then removed as waste or saved for use in other applications. The sheet or layer, now comprising catalyst-containing char, is then subjected to laser irradiation. While not being bound to any particular theory, it is believed that the laser heats the catalyst-containing char to a molten state, decomposing carbon-containing constituents of the catalyst-containing char into graphite precursors, such as polyaromatics, and the graphite precursors are absorbed onto the melted catalyst. It is further believed that the melted catalyst then initiates the precipitation and growth of graphite thereon. The formed graphite is then chemically or physically separated from unreacted (or non-irradiated) portions of the sheet or layer and optionally purified. In some instances the laser can be immobile and the sheet or layer can be rastered relative to the laser. That is, the sheet or layer (and the underlying thermally stable substrate) can be moved relative to the laser such that the laser irradiates the sheet or layer from side to side in lines from top to bottom. In other instances, the sheet or layer (and the underlying thermally stable substrate) is immobile and the laser is configured to move. In such instances, the laser moves to irradiate the immobile compressed sheet or layer from side to side in lines from top to bottom. Alternatively, the char can be removed from the substrate by using any suitable means known to one of ordinary skill in the art such as, for example, doctor blade or air knife, and made to pass through the laser light by pouring, blowing, pushing or other suitable method to cause its translation and or rotation.

In accordance with various aspects of the present disclosure, high purity carbon nanochains or carbon nanotubes can also be produced using the following method. First, the biomass and/or carbonaceous feedstock is coated onto the catalyst, to form a sheet or layer of feedstock on the catalyst. Optionally, the feedstock can be ground, milled or pulverized. Optionally, the feedstock can be ground, milled or pulverized into a powder prior to coating to provide better homogeneity. The size of granules within the powder is not particularly limiting. The powder can range from very fine to very coarse. The catalyst can be any suitable size and substantially two-dimensional or three-dimensional regular or irregular shape. Non-limiting examples of two-dimensional solid form shapes can be a board, a sheet, a plate, and a disc. Non-limiting examples of three-dimensional solid form shapes can be a pellet, a rod, a cylinder, a cuboid, a triangular prism, a pyramid, a sphere, and an ovoid. A sheet or layer of the feedstock can be deposited on the catalyst using any suitable means known in the art such as, for example, coating as a slurry, spraying or by extrusion. Optionally, the feedstock-coated catalyst can be compressed to compress the feedstock, forming the feedstock into a compressed sheet or layer on the catalyst. Compression of the feedstock-coated catalyst can be accomplished using any suitable means known in the art such as, for example, an industrial sheet press or a roller press assembly.

When the preparation of carbon nanochains is desired, the feedstock to catalyst (metal salt) ratio ranges from about 90:10 to about 99.9:0.1 by weight. In other instances, the catalyst ratio ranges from about 91:9 to about 99.85:0.15 by weight. In yet other instances, the feedstock to catalyst ratio ranges from about 92:8 to about 99.8:0.2 by weight, alternatively from about 93:7 to about 99.9:0.1 by weight, alternatively from about 93:7 to about 99.7:0.3 by weight, alternatively from about 94:6 to about 99.6:0.4 by weight, alternatively from about 95:5 to about 99.5:0.5 by weight, alternatively from about 96:4 to about 99.75:0.25 by weight, alternatively from about 97:3 to about 99.85:0.15 by weight, alternatively from about 98.5:1.5 to about 99.85:0.15 by weight and alternatively from about 98:2 to about 99:1 by weight.

When the preparation of carbon nanotubes is desired, the feedstock to catalyst (elemental metal of alloy) ratio ranges from about 90:10 to about 99.9:0.1 by weight. In other instances, the feedstock to catalyst ratio range from about 91:9 to about 99.85:0.15 by weight. In yet other instances, the feedstock to catalyst ratio range from about 92:8 to about 99.8:0.2 by weight, alternatively from about 93:7 to about 99.9:0.1 by weight, alternatively from about 93:7 to about 99.7:0.3 by weight, alternatively from about 94:6 to about 99.6:0.4 by weight, alternatively from about 95:5 to about 99.5:0.5 by weight, alternatively from about 96:4 to about 99.75:0.25 by weight, alternatively from about 97:3 to about 99.85:0.15 by weight, alternatively from about 98.5:1.5 to about 99.85:0.15 by weight and alternatively from about 98:2 to about 99:1 by weight.

The feedstock-coated catalyst is then subjected to pyrolysis (e.g., slow or fast pyrolysis) to convert the feedstock to a char layer on the catalyst, pyrolysis-oil and pyrolysis-gas. That is, the feedstock-coated catalyst is converted to a char-coated catalyst via pyrolysis. Pyrolysis can be performed at a temperature ranging from about 200 to about 1500° C., alternatively from about 200 to about 1200° C., alternatively from about 250 to about 1000° C., and alternatively about 400 to about 1000° C. The pyrolysis-oil and pyrolysis-gas are then removed as waste or saved for use in other applications. The char-coated catalyst is then subjected to laser irradiation. The laser heats the char-coated catalyst, melts the surface of the catalyst and decomposes the char into graphite precursors, such as polyaromatics, and the graphite precursors are absorbed onto the surface melted catalyst. The surface of the melted catalyst then initiates the precipitation and growth of graphite thereon. The formed graphite is then chemically or physically separated from unreacted (or non-irradiated) portions of the sheet or layer and optionally purified. In some instances the laser can be immobile and the char-coated catalyst can be rastered relative to the laser. That is, the char-coated catalyst (and any underlying thermally stable substrate) can be moved relative to the laser such that the laser irradiates the sheet or layer from side to side in lines from top to bottom. In other instances, the char-coated catalyst (and any underlying thermally stable substrate) is immobile and the laser is configured to move. In such instances, the laser moves to irradiate the immobile char-coated catalyst from side to side in lines from top to bottom. In other instances, the char-coated catalyst (and the underlying thermally stable substrate) and the laser both move relative to one another, such as, for instance, the simultaneous translation (and or rotation) of the sheet or layer and laser movement from side to side.

Sheet/layer or solid form formation of the feedstock, catalyst and/or feedstock/catalyst mixture, in accordance with various aspects of the present disclosure can be accomplished using and assembly known in the art using pressures ranging from about 100 pounds per square inch (psi) to about 150,000 psi or any arbitrary upper limit pressure, alternatively from about 1,000 to about 135,000 psi, from about 5,000 to about 120,000 psi, alternatively from about 5,000 to about 100,000 psi, alternatively from about 5,000 to about 90,000 psi, alternatively from about 10,000 to about 90,000 psi, and alternatively from about 20,000 to about 90,000 psi.

When laser irradiation is performed on a two-dimensional solid form such as a sheet or layer, rastering procedures in accordance with various aspects of the present disclosure can be performed any rate (unit of distance/unit of time) suitable for carbon nanochain or carbon nanotube formation. It will be readily appreciated that the rate of rastering will control the amount time any particular portion of the sheet or layer will be subjected to laser irradiation and that the amount of laser irradiation will affect the final carbon nanochain or carbon nanotube yield.

When laser irradiation is performed on a three dimensional solid form such as a pellet, rod, cylinder, a cuboid, a triangular prism, a pyramid, a sphere, and an ovoid, rotation and rastering procedures in accordance with various aspects of the present disclosure can be performed any rates (unit of distance/unit of time) suitable for graphite formation. It will be readily appreciated that the rates of rotation and rastering will control the amount time any particular portion of the solid form will be subjected to laser irradiation and that the amount of laser irradiation will affect the final carbon nanochain or carbon nanotube yield.

As discussed above in accordance with various aspects of the present disclosure, the formed carbon nanochain or carbon nanotube is chemically or physically separated from unreacted (or non-irradiated) portions of the powder of char and optionally purified. Such processes include, but are not limited to sieving, abrasion, magnetic separation, floatation, milling, oxidation with $HNO_3$, washing with HCl followed by heating in air, or any combination of the foregoing. To ensure no metal precipitates (for example, precipitates of the metal catalyst) remain in the final product, a wash with an acidic solution (for example, 1 M HCl) can be performed followed by $H_2O$ neutralization.

The energy content in the pyrolysis-oil and pyrolysis-gas produced by one or more of the above methods would be more than sufficient to meet the energy requirements of the pyrolysis-oil, pyrolysis-gas and graphite production and, in all probability, excess pyrolysis-oil and pyrolysis-gas would be produced as co-products. The process is carbon net negative when using biomass starting material, energy from net zero fuel (bio-oil and syngas) would be used to transform bio-mass grown from atmospheric $CO_2$ and sequestering it in a highly valuable and extremely stable material.

As discussed above, the biomass (or other carbonaceous material) feedstock for the production of the carbon nanochains and/or nanotubes can be from any number of inexpensive sources. Methods in accordance with various aspects of the present disclosure may be extremely economically competitive, producing high quality carbon nanochains and/or nanotubes using methodologies far cheaper and simpler than chemical vapor deposition (CVD) techniques.

In some instances, carbon nanochains and/or nanotubes formed according to various aspects of the disclosure can be used in anodes or cathodes for batteries. When used as in anodes, lithium metal can be deposited on or within the pores of the carbon nanochains and/or nanotubes to make a lithium-containing anode for a lithium metal or lithium ion battery that inhibits lithium metal dendrite growth. In some instances, lithium metal can be deposited on or within the pores of the carbon nanochains and/or nanotubes via electrochemical methods. In some instances, lithium metal can be deposited on or within the pores of the carbon nanochains and/or nanotubes via melt infusion methods. In some instances, lithium metal can be deposited on or within the pores of the carbon nanochains and/or nanotubes via melt wet impregnation methods. When used as in cathodes, one or more desired elements such as sulfur or selenium can be deposited on or within the pores of the carbon nanochains and/or nanotubes to make an element(s)-containing cathode for a lithium metal battery. When the one or more desired elements are sulfur and/or selenium, such a cathode material can inhibit polysulfide and polyselenide formation In some instances, the one or more desired elements can be deposited on or within the pores of the carbon nanochains and/or nanotubes via electrochemical methods. In some instances, the one or more desired elements can be deposited on or within the pores of the carbon nanochains and/or nanotubes via melt infusion methods. In some instances, the one or more desired elements can be deposited on or within the pores of the carbon nanochains and/or nanotubes via melt wet impregnation methods. While electrochemical, melt infusion and wet impregnation methodologies are described for the incorporation of lithium and/or desired elements, one of ordinary skill in the art will readily appreciate other methodologies may be utilized with departing from the scope of the invention.

In some instances, carbon nanochains and/or nanotubes formed according to various aspects of the disclosure can be used as highly porous heterogeneous scaffolds for metal, metal alloy or organometallic catalysts, by depositing said catalysts on or within the pores of the carbon nanochains and/or nanotubes.

In some instances, carbon nanochains and/or nanotubes formed according to various aspects of the disclosure can be used as highly porous adsorbent materials for the purification of liquids, gases, and solutions. In some instances, carbon nanochains and/or nanotubes formed according to various aspects of the disclosure can be used as highly porous adsorbent materials for the removal of organic compounds including oils from of liquids, gases, and solutions. In some instances, carbon nanochains and/or nanotubes formed according to various aspects of the disclosure can be used as highly porous adsorbent materials for the removal of metals and/or metal ions from of liquids, gases, and solutions.

In some instances, carbon nanochains and/or nanotubes formed according to various aspects of the disclosure can be used as additives in structural applications. In some instances, carbon nanochains and/or nanotubes formed according to various aspects of the disclosure can be used as additives in electronics applications. In some instances, carbon nanochains and/or nanotubes formed according to various aspects of the disclosure can be used as additives in capacitors.

EXAMPLES

In the Examples below, either a Firestar t60 (Synrad Inc.) $CO_2$ laser and RF-600 power supply or a 2 mm diameter 980 nm laser beam (200 W, BWT Beijing) were used for the conversion of biomass to carbon nanostructures. Powder X-ray diffraction (PXRD) data was obtained using a Rigaku Miniflex+ diffractometer with Cu Kα radiation. Transmission electron microscopy (TEM) micrographs were obtained using a Talos 200X (FEI) transmission electron microscope. Scanning electron microscopy (SEM) micrographs were obtained using a Teneo LV scanning electron microscope (FEI) with its in-lens secondary electron detector. Pore volume data was determined using the BET method from nitrogen adsorption isotherms obtained with a Tri-Star 3000 (Micrometrics). One of the three sample measurement ports of the Tri-Star was equipped with an empty sample tube with which the saturation vapor pressure (Po) of $N_2$ was measured concurrently with each measurement of the equilibrium vapor pressure (P) over the sample.

Example 1

Biomass (sawdust, sieved to 100-140 mesh or 105-149 micron) and $FeCl_2 \cdot 4H_2O$ salt (about 20 wt % relative to biomass) were loaded into a hardened steel cup (80 mL, Fritsch GmbH) with six balls (hardened steel, 1 cm diameter, 10:1 ball to powder mass ratio) and milled at 300 rpm for 30 min using a planetary mill (Pulverisette 6, Fritsch GmbH). The resulting powder was pressed (Carver 3851 benchtop laboratory press) to form 20 mm diameter pellets. A 21/64" hole was then drilled in the center of each pellet with a drill press and they were heated under $N_2$ or Ar gas (30 mL/min) from room temperature to 600° C. at a 20° C./min ramp rate and held for a total heating time of 30 min. The heating under inert atmosphere resulted in the evolution of bio-oil and gas and transformed the biomass to biochar. After cooling, the pellets were skewered on a ¼" diameter stainless steel rod which was then placed vertically into a stainless steel 4-way cross, feed through the top flange equipped with an Ultra-Torrt™ vacuum fitting (Swagelok) and secured to a stepper motor (STM-23, Applied Motion Products). The chamber was evacuated chamber to $10^{-3}$ torr and then maintained at 0.5 torr with flowing He. The pellets were then irradiated through an anti-reflective coated ZnSe window (Design Research Optics) by a 2 mm diameter 10.4 μm wavelength laser beam (Firestar t60, Synrad Inc., 95% power) while rotating at a linear velocity of 1.63 mm/s (1.2 rev/min) for one full rotation. The material exposed to the laser was removed by gentle abrasion and the resulting powder was lightly ground by hand in an agate mortar and pestle.

The raw product (hollow carbon nanospheres) was purified by microwave digestion, heating from room temperature to 210° C. in 10 min and held for an additional 30 min in $HNO_3$ solution (ACS Grade, 68-70% $HNO_3$) using a XP-1500+ Teflon vessel and MARS 5 Digestion Microwave System (CEM Corp.). After cooling to room temperature, the mixture was diluted with of deionized water and the solid product collected by vacuum filtration (1 μm polyester, GVS LifeSciences). The product was then washed with additional deionized water until a neutral pH was obtained.

Example 2

Biomass (sawdust, sieved to 100-140 mesh or 105-149 micron) and $FeCl_2 \cdot 4H_2O$ salt (about 5 wt % relative to biomass) were loaded into a hardened steel cup (80 mL, Fritsch GmbH) with six balls (hardened steel, 1 cm diameter, 10:1 ball to powder mass ratio) and milled at 300 rpm for 30 min using a planetary mill (Pulverisette 6, Fritsch GmbH). The resulting powder was pressed (Carver 3851 benchtop laboratory press) to form 20 mm diameter pellets. A 21/64" hole was then drilled in the center of each pellet with a drill press and they were heated under $N_2$ or Ar gas (30 mL/min) from room temperature to 600° C. at a 20° C./min ramp rate and held for a total heating time of 30 min. The heating under inert atmosphere resulted in the evolution of bio-oil and gas and transformed the biomass to biochar. After cooling, the pellets were skewered on a ¼" diameter stainless steel rod which was then placed vertically into a stainless steel 4-way cross, feed through the top flange equipped with an Ultra-Torr™ vacuum fitting (Swagelok) and secured to a stepper motor (STM-23, Applied Motion Products). The chamber was evacuated chamber to $10^{-3}$ torr and then maintained at 0.5 torr with flowing He. The pellets were then irradiated through an anti-reflective coated ZnSe window (Design Research Optics) by a 2 mm diameter 10.4 μm wavelength laser beam (Firestar t60, Synrad Inc., 95% power) while rotating at a linear velocity of 1.63 mm/s (1.2 rev/min) for one full rotation. The material exposed to the laser was removed by gentle abrasion and the resulting powder was lightly ground by hand in an agate mortar and pestle.

The raw product (a mixture of hollow carbon nanospheres and carbon nanochains) was purified by microwave digestion, heating from room temperature to 210° C. in 10 min and held for an additional 30 min in $HNO_3$ solution (ACS Grade, 68-70% $HNO_3$) using a XP-1500+ Teflon vessel and MARS 5 Digestion Microwave System (CEM Corp.). After cooling to room temperature, the mixture was diluted with of deionized water and the solid product collected by vacuum filtration (1 μm polyester, GVS LifeSciences). The product was then washed with additional deionized water until a neutral pH was obtained.

Example 3

Biomass (sawdust, sieved to 100-140 mesh or 105-149 micron) and $FeCl_2 \cdot 4H_2O$ salt (about 1 wt % relative to biomass) were loaded into a hardened steel cup (80 mL, Fritsch GmbH) with six balls (hardened steel, 1 cm diameter, 10:1 ball to powder mass ratio) and milled at 300 rpm for 30 min using a planetary mill (Pulverisette 6, Fritsch GmbH). The resulting powder was pressed (Carver 3851 benchtop laboratory press) to form 20 mm diameter pellets. A 21/64" hole was then drilled in the center of each pellet with a drill press and they were heated under $N_2$ or Ar gas (30 mL/min) from room temperature to 600° C. at a 20° C./min ramp rate and held for a total heating time of 30 min. The heating under inert atmosphere resulted in the evolution of bio-oil and gas and transformed the biomass to biochar. After cooling, the pellets were skewered on a ¼" diameter stainless steel rod which was then placed vertically into a stainless steel 4-way cross, feed through the top flange equipped with an Ultra-Torr™ vacuum fitting (Swagelok) and secured to a stepper motor (STM-23, Applied Motion Products). The chamber was evacuated chamber to $10^{-3}$ torr and then maintained at 0.5 torr with flowing He. The pellets were then irradiated through an anti-reflective coated ZnSe window (Design Research Optics) by a 2 mm diameter 10.4 μm wavelength laser beam (Firestar t60, Synrad Inc., 95% power) while rotating at a linear velocity of 1.63 mm/s (1.2 rev/min) for one full rotation. The material exposed to the laser was removed by gentle abrasion and the resulting powder was lightly ground by hand in an agate mortar and pestle.

The raw product (carbon nanochains) was purified by microwave digestion, heating from room temperature to 210° C. in 10 min and held for an additional 30 min in $HNO_3$ solution (ACS Grade, 68-70% $HNO_3$) using a XP-1500+ Teflon vessel and MARS 5 Digestion Microwave System (CEM Corp.). After cooling to room temperature, the mixture was diluted with of deionized water and the solid product collected by vacuum filtration (1 μm polyester, GVS LifeSciences). The product was then washed with additional deionized water until a neutral pH was obtained.

Activation of the carbon nanochains was carried out by mixing the purified product with KOH in a 1:2 mass ratio and ball milled for 10 min. at 40 Hz using a minimill (Pulverisette 23, Fritsch GmbH) with 1 ball (hardened stainless steel, 1.5 cm diameter). The powder was then heated under $N_2$ or Ar gas (30 mL/min) in an alumina boat from room temperature to 800° C. at a 20° C./min ramp rate and held for a total heating time of 100 min, the furnace was then turned off and allowed to cool to ambient.

Example 4

Biomass (sawdust, sieved to 100-140 mesh or 105-149 micron) and 1 wt % (relative to amount of biomass) of Fe metal powder (Alfa Aesar, spherical, <10 micron, 99.9+ purity) were loaded into a hardened steel cup (80 mL, Fritsch GmbH) with six balls (hardened steel, 1 cm diameter, 10:1 ball to powder mass ratio) and milled at 300 rpm for 1 min using a planetary mill (Pulverisette 6, Fritsch GmbH). The resulting powder was pressed (Carver 3851 benchtop laboratory press) to form 20 mm diameter pellets. A 21/64" hole was then drilled in the center of each pellet with a drill press and they were heated under $N_2$ or Ar gas (30 mL/min) from room temperature to 600° C. at a 20° C./min ramp rate and held for a total heating time of 30 min. The heating under inert atmosphere resulted in the evolution of bio-oil and gas and transformed the biomass to biochar. After cooling, the pellets were skewered on a ¼" diameter stainless steel rod which was then placed vertically into a stainless steel 4-way cross, feed through the top flange equipped with an Ultra-Torr™ vacuum fitting (Swagelok) and secured to a stepper motor (STM-23, Applied Motion Products). The chamber was evacuated chamber to $10^{-3}$ torr and then maintained at 0.5 torr with flowing He. Each pellet was then irradiated through an anti-reflective coated fused silica window (Thorlabs) by a 2 mm diameter 980 nm laser beam (200 W, BWT Beijing) while rotating at a linear velocity of 1.63 mm/s (1.2 rev/min) for one full rotation. The material exposed to the laser was removed by gentle abrasion and the resulting powder was lightly ground by hand in an agate mortar and pestle.

The raw product (carbon nanotubes) was purified by microwave digestion, heating from room temperature to 210° C. in 10 min and held for an additional 30 min in $HNO_3$ solution (ACS Grade, 68-70% $HNO_3$) using a XP-1500+ Teflon vessel and MARS 5 Digestion Microwave System (CEM Corp.). After cooling to room temperature, the mixture was diluted with of deionized water and the solid product collected by vacuum filtration (1 μm polyester, GVS LifeSciences). The product was then washed with additional deionized water until a neutral pH was obtained.

Examples 1-4—Discussion

Figure 2:
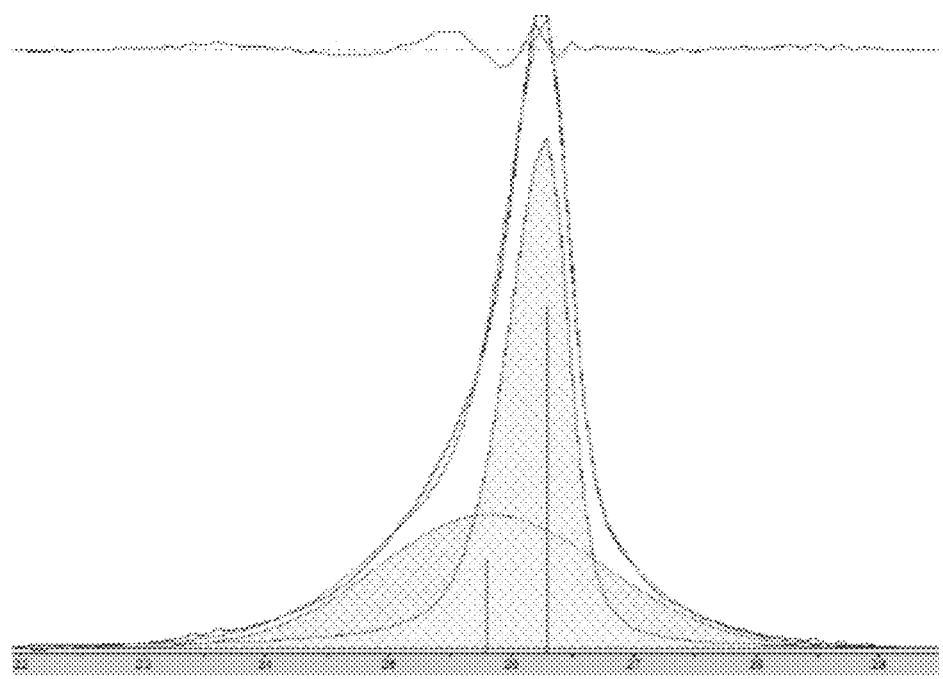
FIG. 2 is an expanded view of the powder x-ray diffractogram (2θ=22-29 deg.) of FIG. 1, of the carbon nanostructure made using 5 wt % $FeCl_2 \cdot 4H_2O$ catalyst.

FIG. 1 shows powder x-ray diffractograms of carbon nanostructures made according to Examples 1-3 with 20 wt % (top; Example 1), 5 wt % (middle; Example 2) and 1 wt % (bottom; Example 3) $FeCl_2.4H_2O$ catalyst. The peak at ~26 deg. 2θ corresponds to the graphene interlayer spacing of the multilayer graphene shells of the hollow carbon nanospheres and the carbon nanochains. At concentrations high concentrations of metal salt (e.g. 20 wt %), a single peak is present corresponding to the interlayer spacing of the graphene multilayers wall of hollow carbon nanospheres. When the concentration is decreased to 5 wt %, both hollow carbon nanospheres and carbon nanochains form and two overlapping interlayer spacing peaks appear, one corresponding to hollow carbon nanospheres and the other to carbon nanochains. At low concentration (e.g. 1%), the product is essentially only hollow carbon nanospheres as can be seen from the absence of the XRD peak corresponding to hollow carbon nanospheres. FIG. 2 is an expanded view of the powder x-ray diffractogram (2θ=22-29 deg.) of FIG. 1 of the carbon nanostructure made according to Example 2. The diffractogram shows the peak corresponding to the interlayer spacing of the graphene walls of nanostructures. Deconvolution of the data shows the presence of two peaks (shaded), the sharper, higher intensity, peak with its maximum (indicated by the vertical line to zero) at higher angle corresponding to hollow carbon nanospheres and the broader, lower intensity, peak with its maximum at lower angle corresponding to carbon nanochains. The sum of the fit peaks and the data are overlaid and the difference between the sum of the deconvoluted peaks and the data is shown at the top of the plot, demonstrating a good fit.

Figure 3:
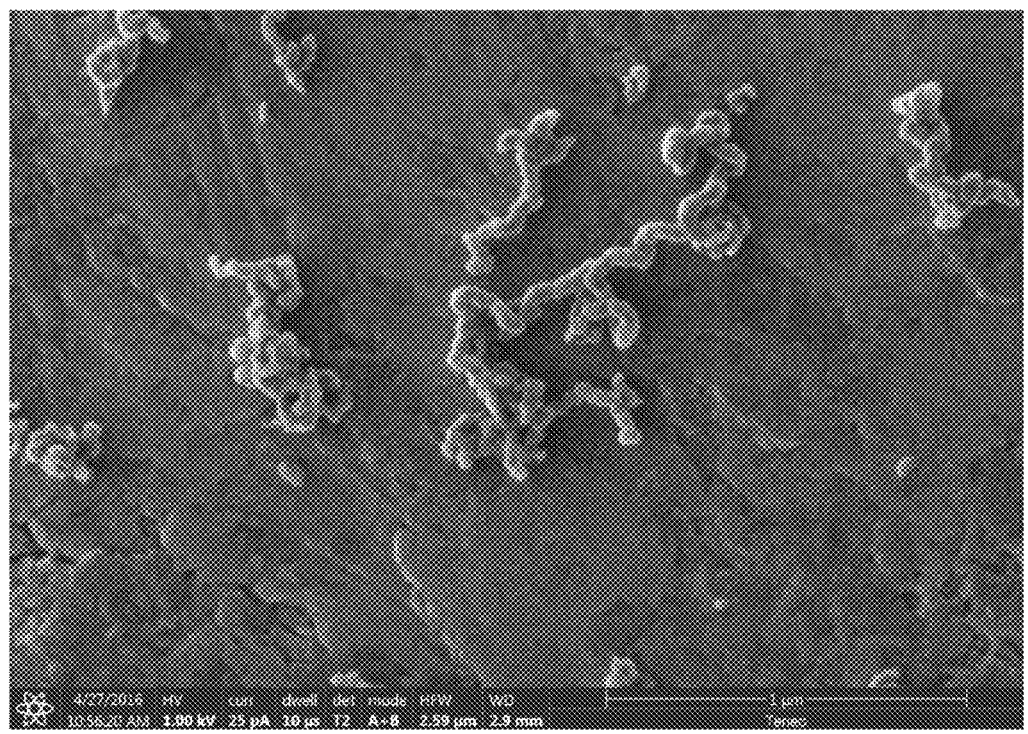
FIG. 3 is a scanning electron microscopy (SEM) image of carbon nanochains formed according to various aspects of the disclosure using 1 wt % $FeCl_2 \cdot 4H_2O$ catalyst.
Figure 4:
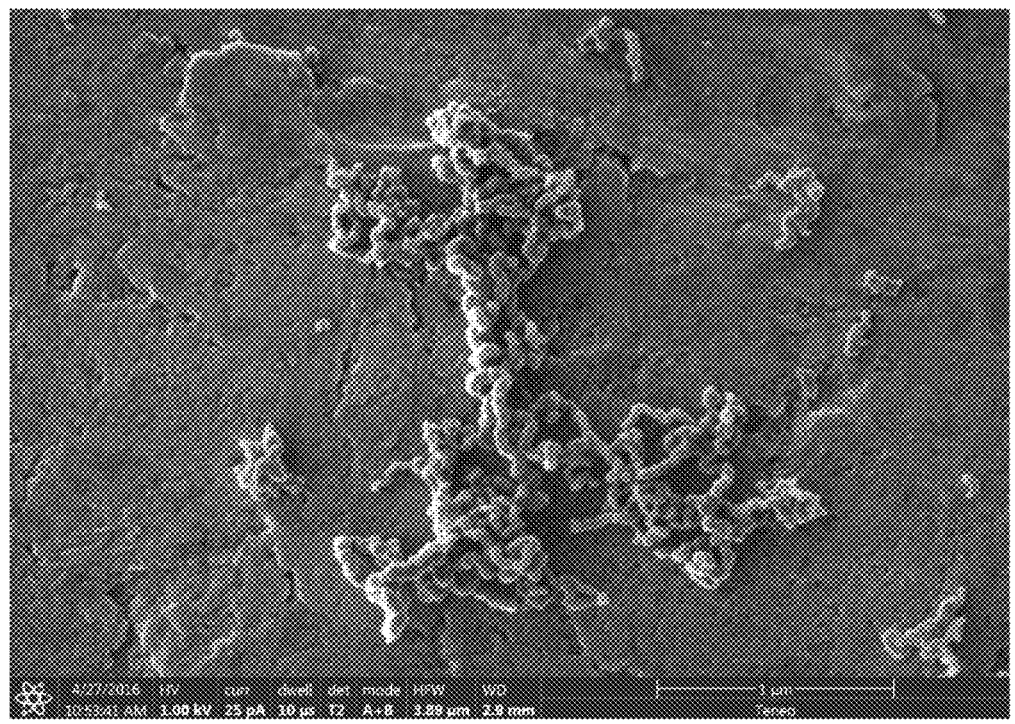
FIG. 4 is another SEM image of carbon nanochains formed according to various aspects of the disclosure using 1 wt % $FeCl_2 \cdot 4H_2O$ catalyst.
Figure 5:
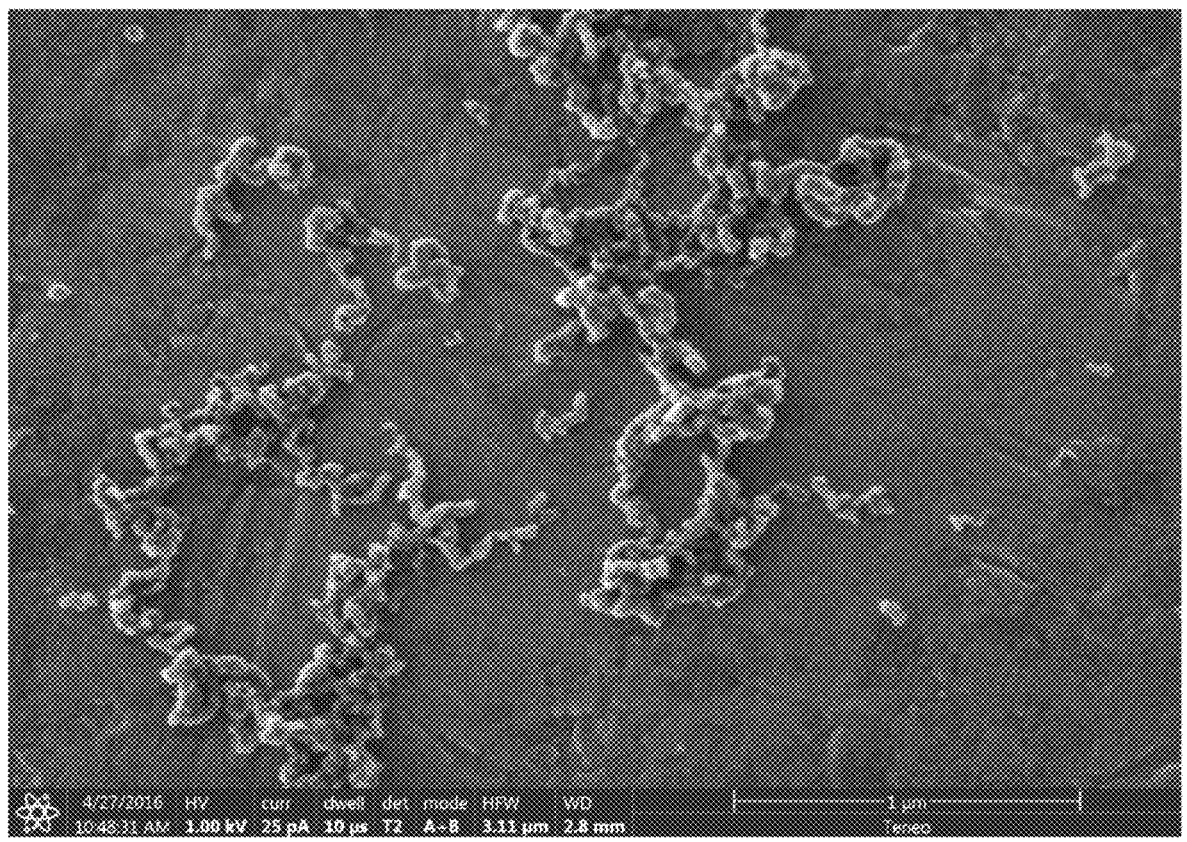
FIG. 5 is another SEM image of carbon nanochains formed according to various aspects of the disclosure using 1 wt % $FeCl_2 \cdot 4H_2O$ catalyst.
Figure 6:
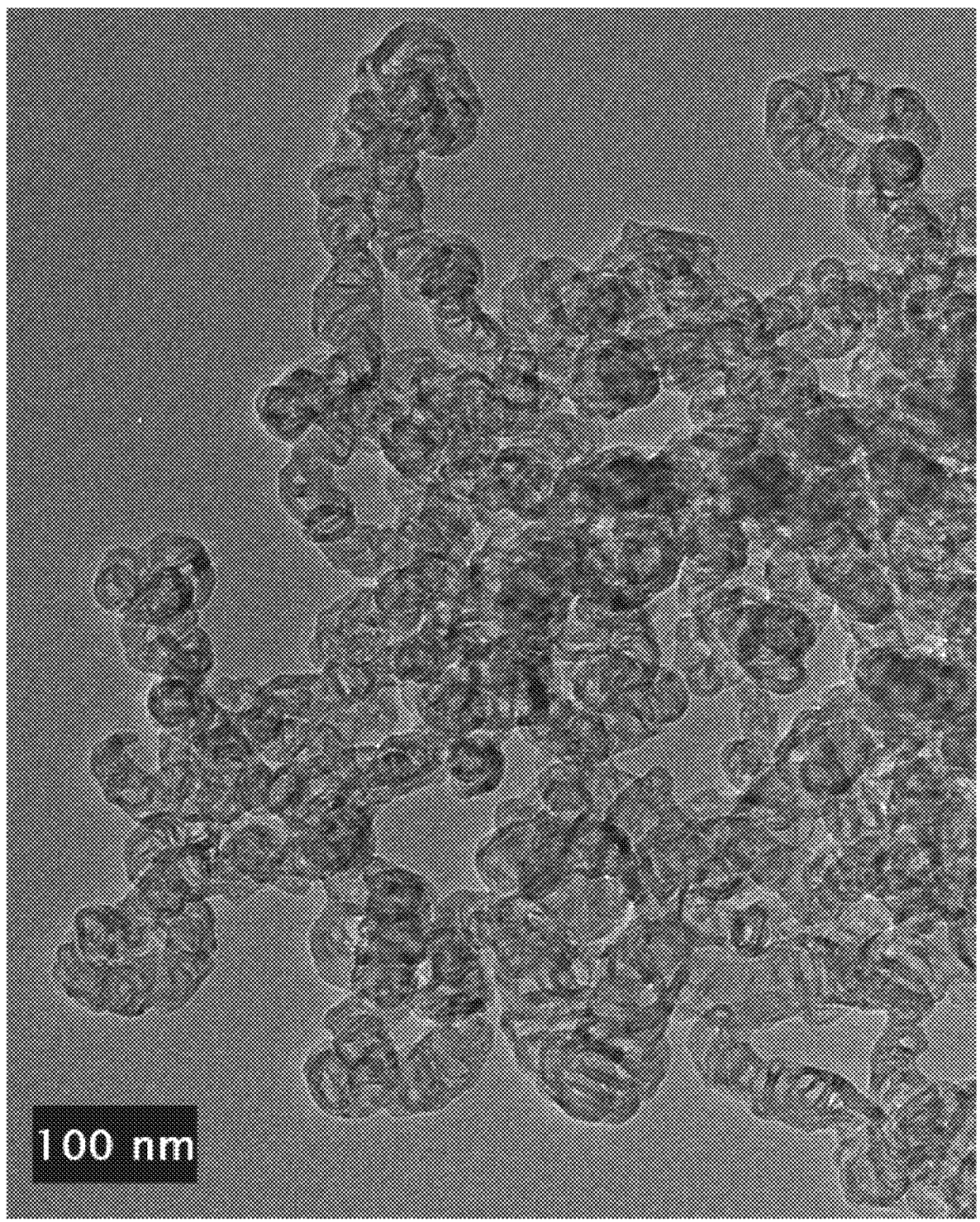
FIG. 6 is a transmission electron microscopy (TEM) image of carbon nanochains formed according to various aspects of the disclosure using 1 wt % $FeCl_2 \cdot 4H_2O$ catalyst.
Figure 7:
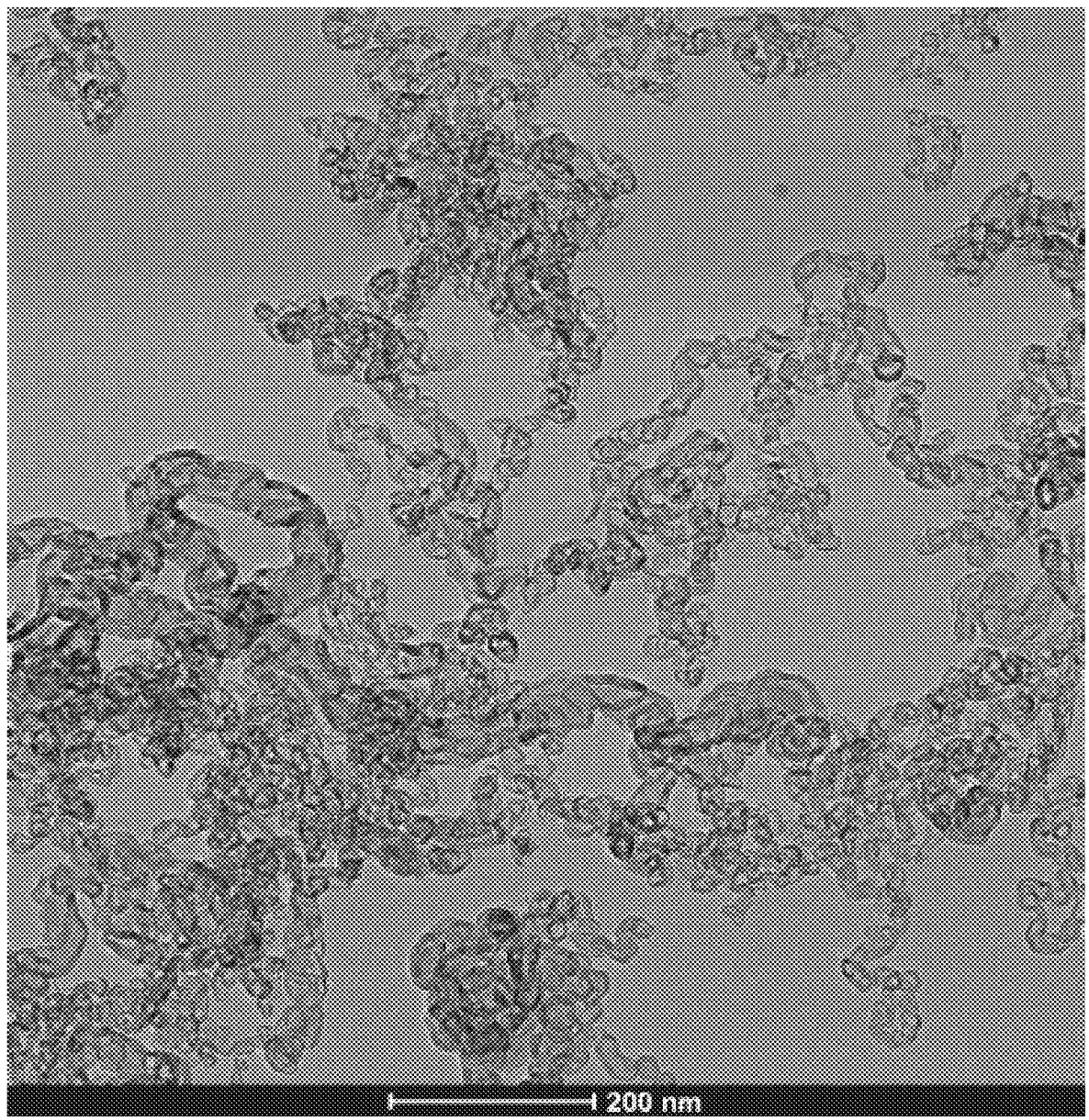
FIG. 7 is another TEM image of carbon nanochains formed according to various aspects of the disclosure using 1 wt % $FeCl_2 \cdot 4H_2O$ catalyst.
Figure 8:
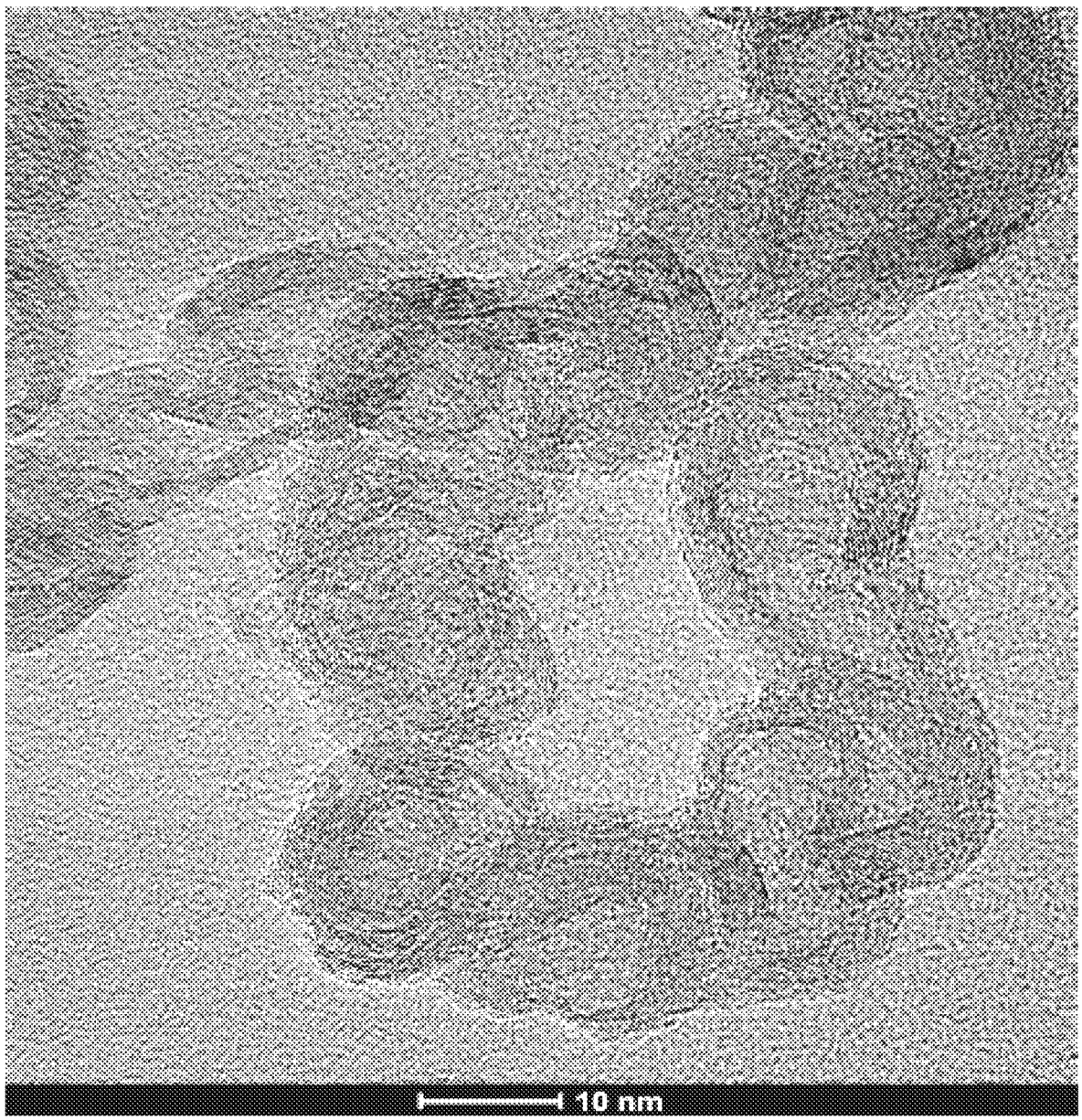
FIG. 8 is a high resolution TEM image of carbon nanochains formed according to various aspects of the disclosure using 1 wt % $FeCl_2 \cdot 4H_2O$ catalyst.
Figure 9:
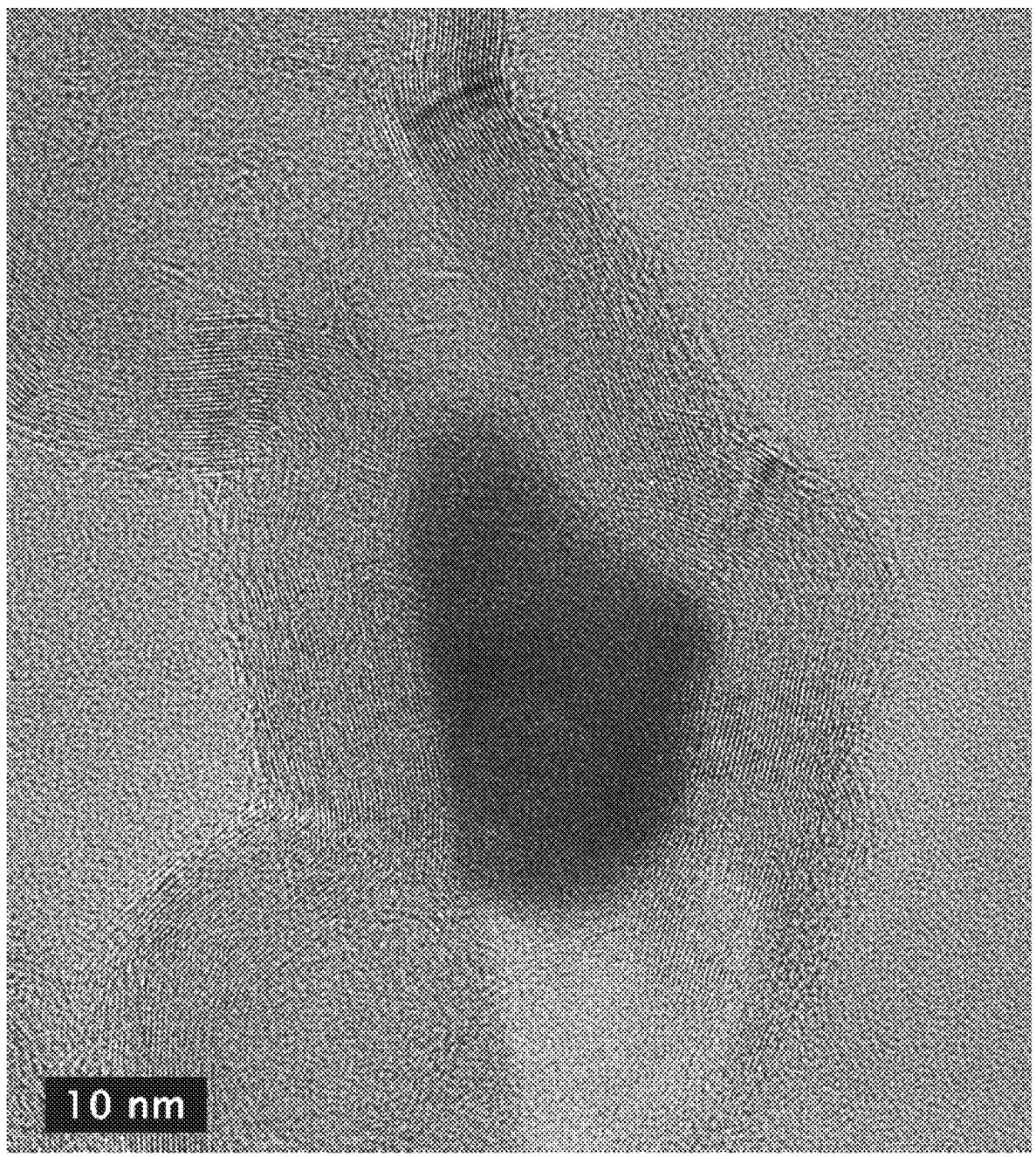
FIG. 9 is another high resolution TEM image of carbon nanochains formed according to various aspects of the disclosure using 1 wt % $FeCl_2 \cdot 4H_2O$ catalyst.
Figure 10:
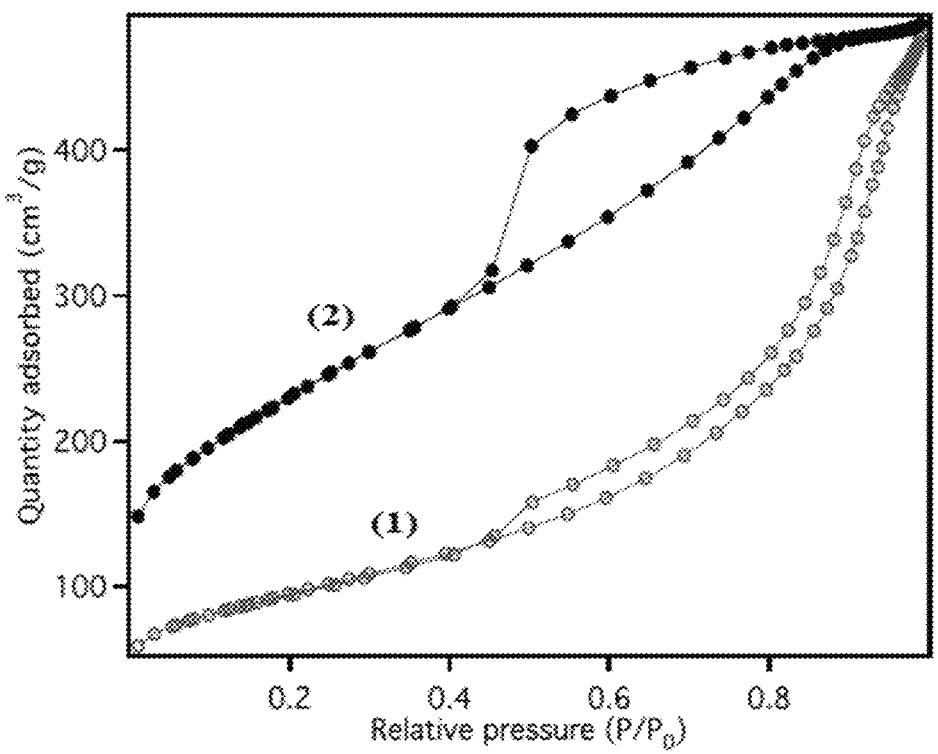
FIG. 10 is a graph of $N_2(g)$ adsorption/desorption isotherms for purified carbon nanochains formed according to various aspects of the disclosure using 1 wt % $FeCl_2 \cdot 4H_2O$ catalyst (1) before activation and (2) after activation.

FIGS. 3-5 are scanning electron microscopy (SEM) images of carbon nanochains formed in Example 3 and FIGS. 6-7 are TEM images of carbon nanochains formed in Example 3. FIG. 8 is a high resolution TEM image of carbon nanochains formed in Example 3. The carbon nanochains in exhibit a clear chain-like structure, where the nanochains are made of a series of connected carbon shell links. Also, as evidenced by the TEM images, no metal catalyst is present within the nanochains. FIG. 9 is another high resolution TEM image of carbon nanochains formed in Example 3. This TEM image shows two adjacent links of a carbon nanochain and further shows that the walls of the links in the chains are interconnected graphene multilayers and the presence of metal catalyst (dark area in center) that presumably had been expelled from one link to form an adjacent link before solidifying as it cooled, terminating the growth of the chain at the link in which it is seen in the image.

Figure 11:
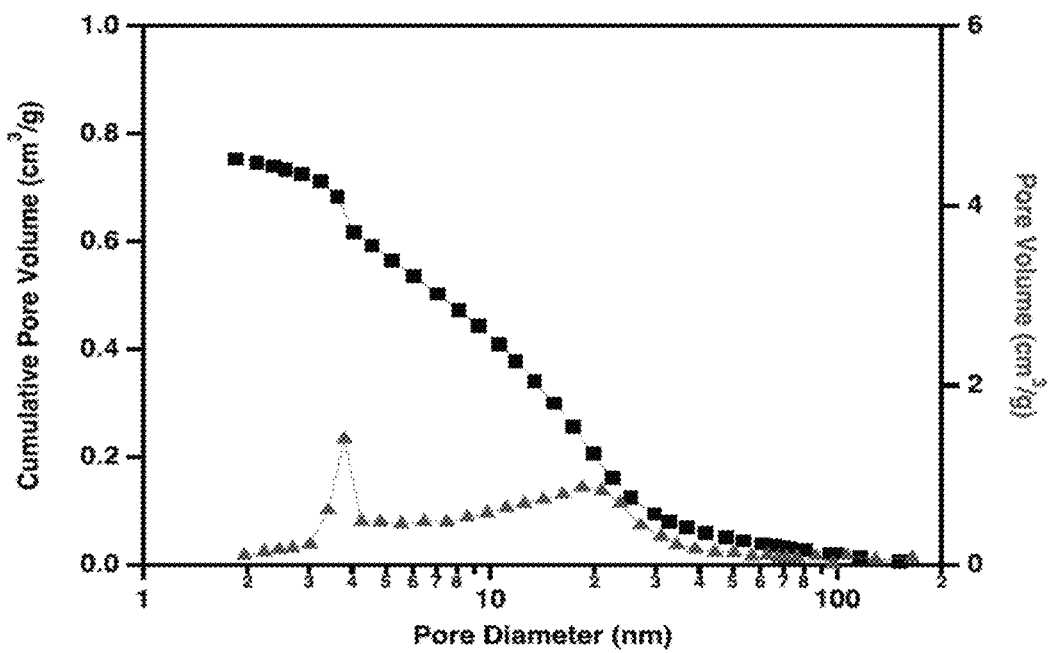
FIG. 11 is a graph of the cumulative pore volume (square data points) and pore volume (triangle data points) plotted against pore diameter for carbon nanochains, formed according to various aspects of the disclosure using 1 wt % $FeCl_2 \cdot 4H_2O$ catalyst, prior to activation.
Figure 12:
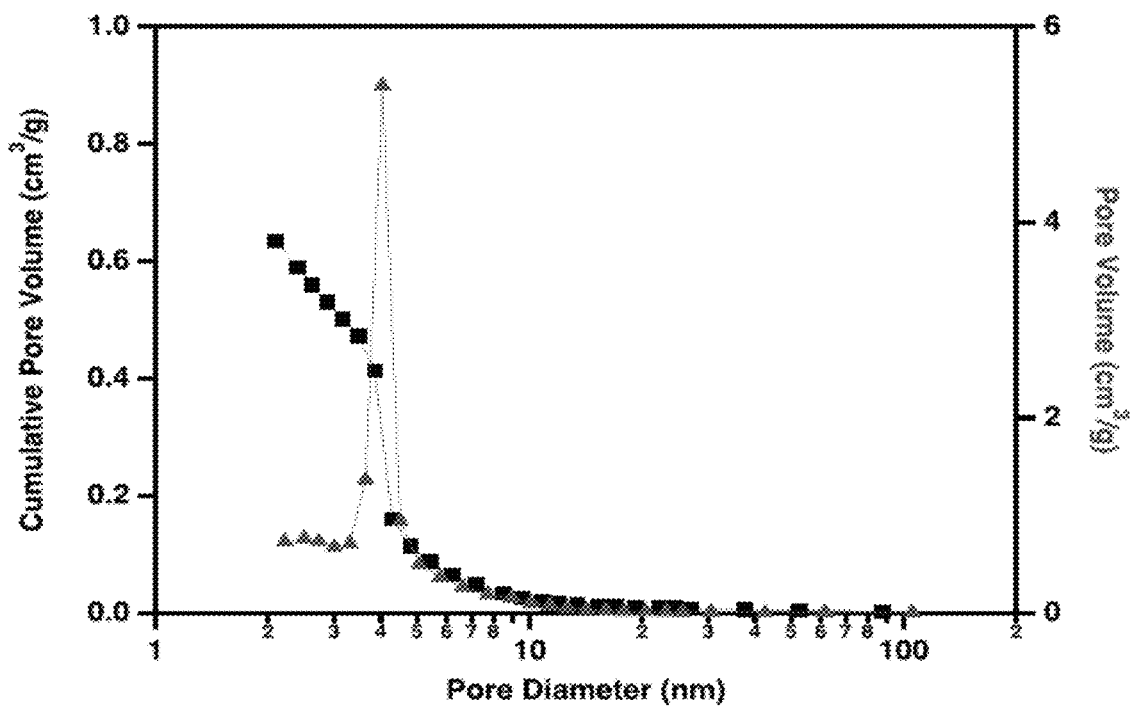
FIG. 12 is a graph of the cumulative pore volume (square data points) and pore volume (triangle data points) plotted against pore diameter for carbon nanochains, formed according to various aspects of the disclosure using 1 wt % $FeCl_2 \cdot 4H_2O$ catalyst, after activation.

FIG. J is a graph of $N_2(g)$ adsorption/desorption isotherms for purified carbon nanochains formed in Example 3 (1) before activation and (2) after activation. FIG. 11 is a graph of the cumulative pore volume (square data points) and pore volume (triangle data points) plotted against pore diameter for carbon nanochains, formed in Example 3, prior to activation. FIG. 12 is a graph of the cumulative pore volume (square data points) and pore volume (triangle data points) plotted against pore diameter for carbon nanochains, formed in Example 3, after activation. As can be seen, the volumes of pores having diameters of about 4 nm substantially increases after activation.

Figure 13:
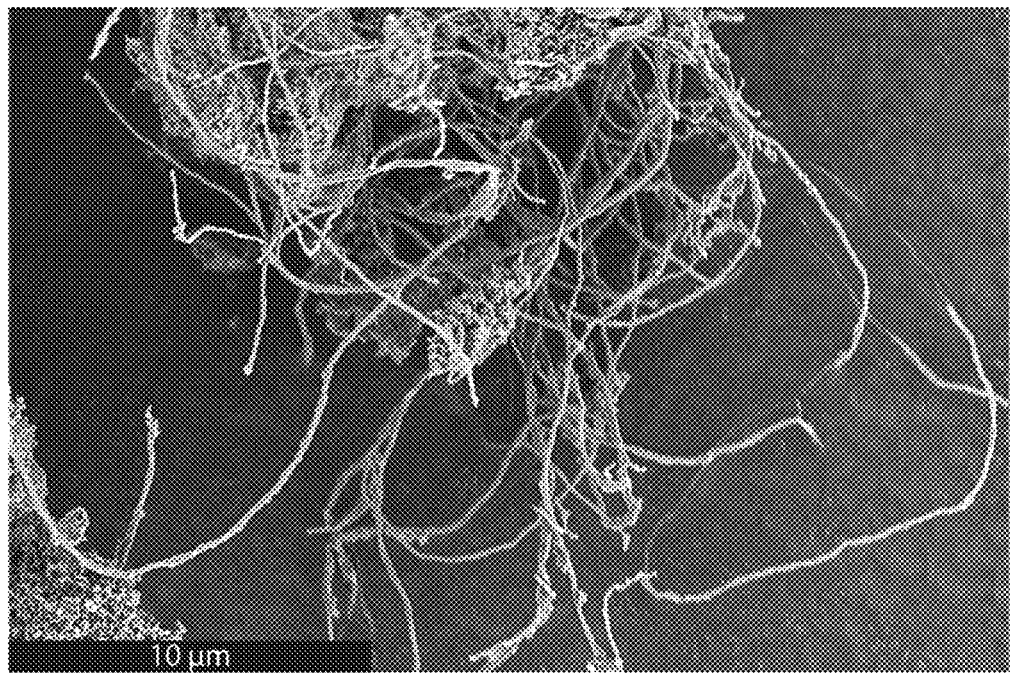
FIG. 13 is an SEM image of carbon nanotubes formed according to various aspects of the disclosure.
Figure 14:
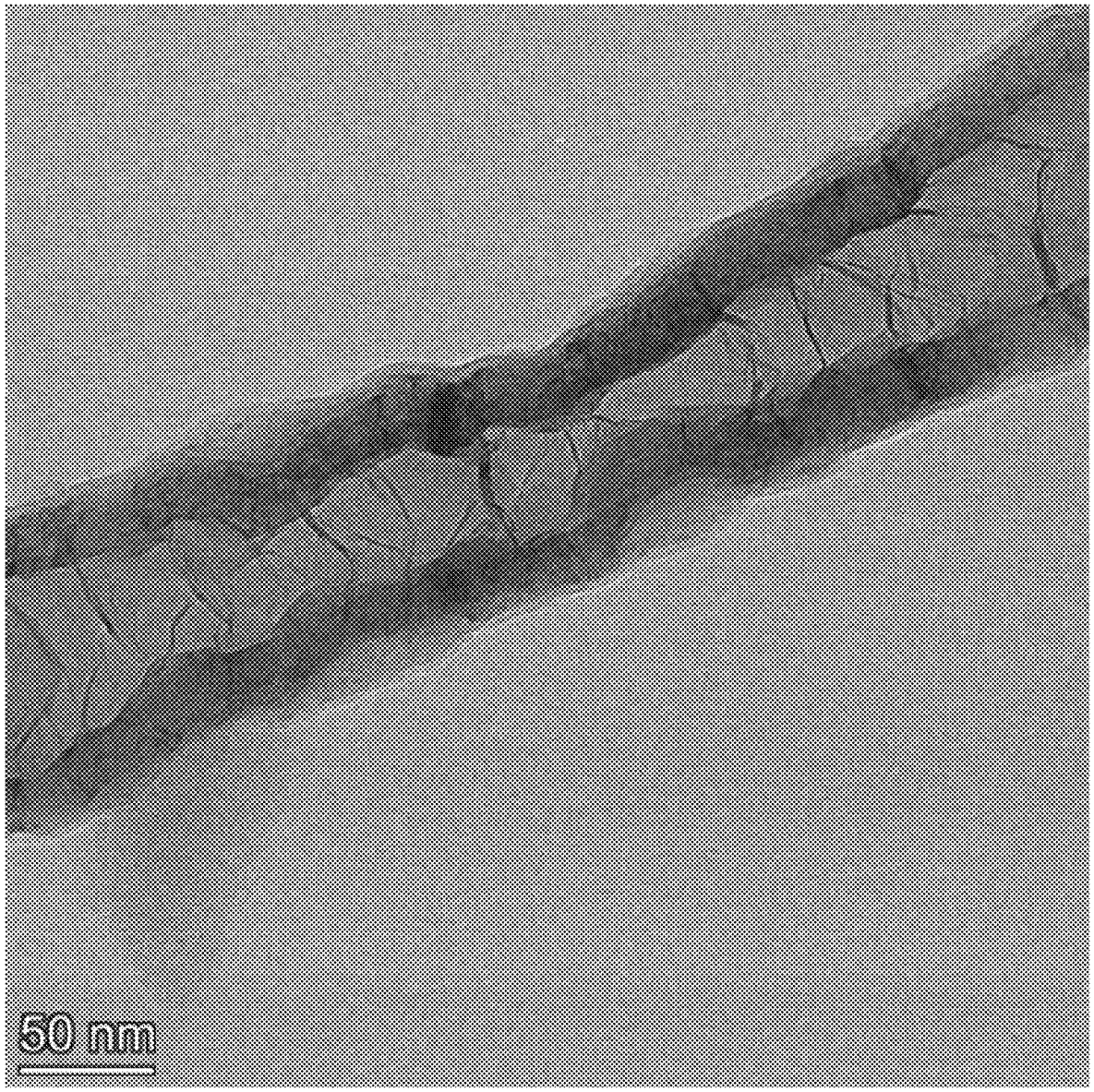
FIG. 14 is a TEM image of a section of a carbon nanotube formed according to various aspects of the disclosure.
Figure 15:
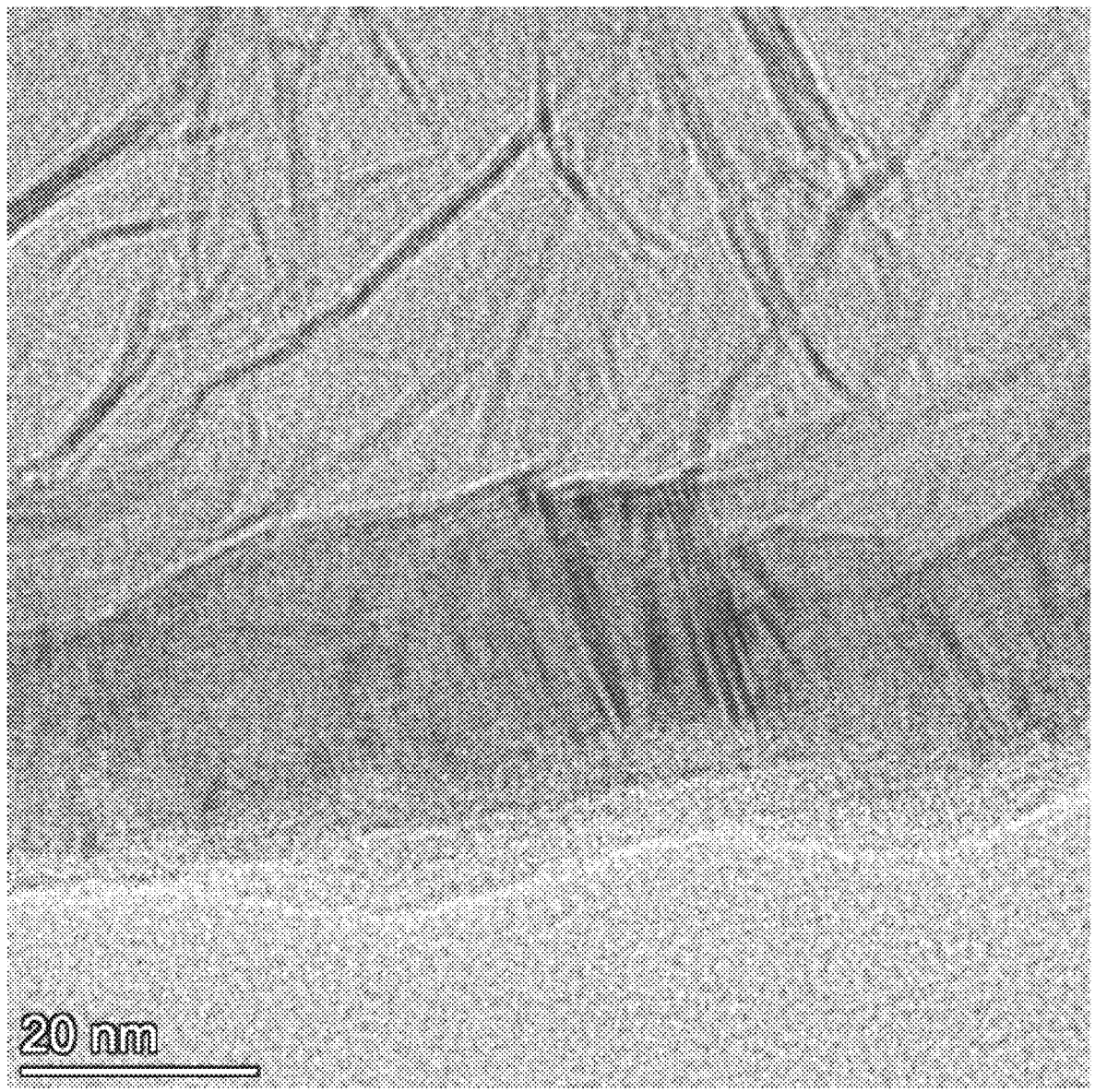
FIG. 15 is a high resolution TEM image of a section of a carbon nanotube formed according to various aspects of the disclosure.

FIG. 13 is an SEM image of carbon nanotubes formed in Example 4. FIG. 14 is a TEM image of a section of a carbon nanotube formed in Example 4. As can be seen, the nanotube is multiwalled, with a hollow center surrounded by concentric layers of graphene. FIG. 15 is a high resolution TEM image of a section of a carbon nanotube formed in Example 4. The high resolution TEM shows lattice fringes demonstrating the walls of the carbon nanotubes are composed of concentric graphene layers.

McKinnon (U.S. Pat. No. 7,601,321 B2) describes the production of carbon nanospheres by charring a "carbon based substrate" (cellulose in the example) mixed with 1-99 wt % metal salt and subsequently heating above 2000° C. or higher in an inert gas atmosphere, wherein the metal salt is a Ti, V, Cr, Mn, Fe, Co, Ni or Cu salt. McKinnon describes the product of laser pyrolysis to be "30 nm particles of pure Ni, each surrounded by 5-10 nm shell of graphite" (Illustrative Pyrolysis Process, column 6, lines 17-19). McKinnon erroneously states that the shells are "graphite", which clearly cannot be the case because graphene layers of graphite cannot be curved and the spacing between the layers claimed, 3.41 Å, demonstrates that they shells are turbostatic carbon, not graphite. Also of note, McKinnon claims "heating above 2000° C. or higher". We have measured the surface temperature of a process similar to McKinnon's Illustrative Pyrolysis Process and found the temperature to be less than 1600° C.

We have repeated McKinnon's procedure a large number of times and find that if the metal salt wt % is higher than about 10%, we obtain similar results (i.e., carbon nanospheres). We have in fact used the exact same laser that he used and the same parameters, so the agreement of our results is not surprising. However, we find McKinnon's claims to be in error if the wt % of metal salts is less than 10 wt %, preferably less than 5 wt %, using the same procedure described in McKinnon's patent, we do not obtain the individual carbon nanospheres filled with (chemically removable) metal as described in McKinnon, but rather carbon nano-chains and nanotubes that are, for the most part, devoid of metal. The carbon chains consist of links of carbon nanoshells that are similar to the carbon nanospheres of McKinnon, but without metal cores and linked together in chains with walls that are continuous between many of the adjacent shells. Many of the links are joined by clearly open channels, akin to carbon nanotubes, while TEM images do not make it clear if there are or are not open channels between other links. Thus, it appears that below 10 wt %, preferably below 5 wt %, the production mechanism and the product changes dramatically, facts that were not predicted or even suggested by McKinnon.

Without be bound to any particular theory, we believe that using metal catalysts in larger amounts (specifically higher than about 10 wt %) and/or having particle diameters that are larger than the particle diameter of the char with which the catalyst is mixed, the metal nanoparticles that are formed during charring and/or laser pyrolysis are large enough to stay relatively stationary during laser pyrolysis, absorbing carbon from the surround matrix, and then precipitating graphene shells upon cooling, forming concentric graphene shells surrounding the metal core as described by McKinnon. However, at low wt % (preferably 5 wt % or less), we believe the metal nanoparticles precipitate a few graphene layers (~5-20 or so) but the pressure of the growing layers (they would tend to grow inward, compressing the metal nanoparticle as the earlier grown layers would form an expansion barrier) expels the nanoparticle, which then forms an adjacent link by precipitation of additional graphene shells, is ejected again, forms the next link and so on. This change in mechanism and product is possibly due to the very small size of the catalyst nanoparticles form at less than 5 wt %, typically only a few nanometers to ~10 nm.

The material formed in examples 2 and 3 are substantially different than that described by McKinnon in that we are forming carbon nanochains comprising empty (the vast majority being metal free) multilayer graphene shells linked together, many of which share continuous walls and have open channels from one link to the next. In contrast, McKinnon makes individual carbon nanospheres filled with metal that can be later chemically removed.

Additionally, Wagner claims that crystalline graphite can be formed by laser pyrolysis of char in the presence of metal (PCT/US2018/020690). We have found that if the size of the metal particles in less than that of the char particles and the metal to char ratio is low such that the metal droplets formed from the metal particles during laser pyrolysis remain smaller than the char particles, carbon nanotubes can be formed rather than graphite. While not being bound to any theory, it is believed that the laser melts the metal particles and they are drawn into the char by capillary action, producing graphene walls of the carbon nanotubes and/or nanochains as the metal travels through the char. FIG. 13 shows and SEM image of a cluster of carbon nanotubes made by this procedure and FIG. 14 and FIG. 15 show a higher resolution TEM images that, as discussed above, demonstrate that they are composed of concentric graphene walls surrounding a hollow core.

Although the present invention and its objects, features and advantages have been described in detail, other embodiments are encompassed by the invention. Finally, those skilled in the art should appreciate that they can readily use the disclosed conception and specific embodiments as a basis for designing or modifying other structures for carrying out the same purposes of the present invention without departing from the scope of the invention as defined by the appended claims.

What is claimed is:

1. A method for producing carbon nanochains, the method comprising:
   subjecting a feedstock/catalyst mixture comprising a carbon-containing feedstock and a catalyst to irradiation with a laser to convert the feedstock into carbon nanochains in the presence of the catalyst, wherein
   the carbon-containing feedstock is a biomass, a carbonaceous material, or a combination thereof; and
   the catalyst is a transition metal salt.

2. The method of claim 1, further comprising converting the feedstock/catalyst mixture to a powdered form prior to being subjected to irradiation with the laser.

3. The method of claim 1, wherein
   the carbon-containing feedstock is a biomass, the biomass comprising one or more of lignin, lignocellulose, microcrystalline cellulose, wood flour, sawdust, a dehydrated agricultural product, dehydrated food waste, dehydrated livestock feces, *miscanthus*, switchgrass, hemp, poplar, willow, sorghum, sugarcane, bamboo, agave, alfalfa, a grain, algae, and oil palm, or
   the carbon-containing feedstock is a carbonaceous material, the carbonaceous material comprising one or more of an artificial polymer, a natural polymer, a plastic, peat, coal, pitch, coke, a carbon black, an activated carbon, a mesophase carbon, and charcoal.

4. The method of claim 1, wherein the laser is immobile and the method further comprises:
   forming the mixture into a solid form prior to subjecting to laser irradiation; and
   rotating or rastering the solid form while subjecting the solid form to the laser irradiation.

5. The method of claim 1, wherein the feedstock/catalyst mixture has a feedstock to catalyst ratio ranging from about 93:7 to about 99.7:0.1 by weight.

6. A method for producing carbon nanotubes, the method comprising:
   subjecting a feedstock/catalyst mixture comprising a carbon-containing feedstock and a catalyst to irradiation with a laser to convert the feedstock into carbon nanotubes in the presence of the catalyst, wherein
   the carbon-containing feedstock is a biomass, a carbonaceous material, or a combination thereof; and
   the catalyst is an elemental metal, an alloy, or a combination thereof.

7. The method of claim 6, further comprising converting the feedstock/catalyst mixture to a powdered form prior to being subjected to irradiation with the laser.

8. The method of claim 6, wherein
   the carbon-containing feedstock is a biomass, the biomass comprising one or more of lignin, lignocellulose, microcrystalline cellulose, wood flour, sawdust, a dehydrated agricultural product, dehydrated food waste, dehydrated livestock feces, *miscanthus*, switchgrass, hemp, poplar, willow, sorghum, sugarcane, bamboo, agave, alfalfa, a grain, algae, and oil palm, or
   the carbon-containing feedstock is a carbonaceous material, the carbonaceous material comprising one or more of an artificial polymer, a natural polymer, a plastic, peat, coal, pitch, coke, a carbon black, an activated carbon, a mesophase carbon, and charcoal.

9. The method of claim 6, wherein the laser is immobile and the method further comprises:
   forming the mixture into a solid form prior to subjecting to laser irradiation; and
   rotating or rastering the solid form while subjecting the solid form to the laser irradiation.

10. The method of claim 6, wherein the feedstock/catalyst mixture has a feedstock to catalyst ratio ranging from about 93:7 to about 99.7:0.1 by weight.

11. A method for producing carbon nanochains, the method comprising:
    subjecting a feedstock/catalyst mixture comprising a carbon-containing feedstock and a catalyst to pyrolysis to convert the mixture to a feedstock/catalyst-containing char; and
    subjecting the char to irradiation with a laser to convert the feedstock into carbon nanochains in the presence of the catalyst, wherein
    the carbon-containing feedstock is a biomass, a carbonaceous material, or a combination thereof; and
    the catalyst is a transition metal salt.

12. The method of claim 11, further comprising converting the feedstock/catalyst mixture to a powdered form prior to being subjected to irradiation with the laser.

13. The method of claim 11, wherein
    the carbon-containing feedstock is a biomass, the biomass comprising one or more of lignin, lignocellulose, microcrystalline cellulose, wood flour, sawdust, a dehydrated agricultural product, dehydrated food waste, dehydrated livestock feces, *miscanthus*, switchgrass, hemp, poplar, willow, sorghum, sugarcane, bamboo, agave, alfalfa, a grain, algae, and oil palm, or
    the carbon-containing feedstock is a carbonaceous material, the carbonaceous material comprising one or more of an artificial polymer, a natural polymer, a plastic, peat, coal, pitch, coke, a carbon black, an activated carbon, a mesophase carbon, and charcoal.

14. The method of claim 11, wherein the laser is immobile and the method further comprises:
   forming the mixture into a solid form prior to subjecting to pyrolysis; and
   rotating or rastering the solid form char while subjecting the solid form char to the laser irradiation.

15. The method of claim 11, wherein the feedstock/catalyst mixture has a feedstock to catalyst ratio ranging from about 93:7 to about 99.7:0.1 by weight.

16. A method for producing carbon nanotubes, the method comprising:
   subjecting a feedstock/catalyst mixture comprising a carbon-containing feedstock and a catalyst to pyrolysis to convert the mixture to a feedstock/catalyst-containing char; and
   subjecting the char to irradiation with a laser to convert the feedstock into carbon nanotubes in the presence of the catalyst, wherein
   the carbon-containing feedstock is a biomass, a carbonaceous material, or a combination thereof; and
   the catalyst is an elemental metal, an alloy, or a combination thereof.

17. The method of claim 16, further comprising converting the feedstock/catalyst mixture to a powdered form prior to being subjected to irradiation with the laser.

18. The method of claim 16, wherein
   the carbon-containing feedstock is a biomass, the biomass comprising one or more of lignin, lignocellulose, microcrystalline cellulose, wood flour, sawdust, a dehydrated agricultural product, dehydrated food waste, dehydrated livestock feces, *miscanthus*, switchgrass, hemp, poplar, willow, sorghum, sugarcane, bamboo, agave, alfalfa, a grain, algae, and oil palm, or
   the carbon-containing feedstock is a carbonaceous material, the carbonaceous material comprising one or more of an artificial polymer, a natural polymer, a plastic, peat, coal, pitch, coke, a carbon black, an activated carbon, a mesophase carbon, and charcoal.

19. The method of claim 16, wherein the laser is immobile and the method further comprises:
   forming the mixture into a solid form prior to subjecting to pyrolysis; and
   rotating or rastering the solid form char while subjecting the solid form char to the laser irradiation.

20. The method of claim 16, wherein the feedstock/catalyst mixture has a feedstock to catalyst ratio ranging from about 93:7 to about 99.7:0.1 by weight.

* * * * *